US011763099B1

(12) United States Patent
Oh et al.

(10) Patent No.: US 11,763,099 B1
(45) Date of Patent: Sep. 19, 2023

(54) PROVIDING TRANSLATED SUBTITLE FOR VIDEO CONTENT

(71) Applicant: VoyagerX, Inc., Seoul (KR)

(72) Inventors: Hyeonsoo Oh, Seoul (KR); Sedong Nam, Seoul (KR)

(73) Assignee: VoyagerX, Inc., Seoul (KR)

( * ) Notice: Subject to any disclaimer, the term of this patent is extended or adjusted under 35 U.S.C. 154(b) by 0 days.

(21) Appl. No.: 18/126,341

(22) Filed: Mar. 24, 2023

Related U.S. Application Data

(60) Provisional application No. 63/335,564, filed on Apr. 27, 2022.

(51) Int. Cl.
G10L 15/26 (2006.01)
G06F 40/47 (2020.01)
G10L 15/05 (2013.01)
G11B 27/34 (2006.01)
G10L 25/57 (2013.01)
G10L 25/93 (2013.01)
G10L 15/22 (2006.01)

(52) U.S. Cl.
CPC .............. *G06F 40/47* (2020.01); *G10L 15/05* (2013.01); *G10L 15/22* (2013.01); *G10L 15/26* (2013.01); *G10L 25/57* (2013.01); *G10L 25/93* (2013.01); *G11B 27/34* (2013.01)

(58) Field of Classification Search
CPC ................................. G10L 15/26; G06F 40/40
See application file for complete search history.

(56) References Cited

U.S. PATENT DOCUMENTS

| 6,505,153 | B1 | 1/2003 | Van Thong et al. |
| 8,447,604 | B1 | 5/2013 | Chang |
| 8,825,488 | B2 | 9/2014 | Scoggins, II et al. |
| 8,825,489 | B2 | 9/2014 | Scoggins, II et al. |
| 9,066,049 | B2 | 6/2015 | Scoggins, II et al. |
| 9,191,639 | B2 | 11/2015 | Kuspa |
| 9,230,547 | B2 | 1/2016 | Wilder et al. |
| 10,034,028 | B2 | 7/2018 | Polumbus et al. |
| 10,733,230 | B2 | 8/2020 | Jo |

(Continued)

FOREIGN PATENT DOCUMENTS

| CN | 108090038 A | 5/2018 |
| CN | 109614604 A | 4/2019 |

(Continued)

OTHER PUBLICATIONS

Ramani et al., "Automatic Subtitle Generation for Videos", 2020 6th International Conference on Advanced Computing and Communication Systems (ICACCS) (2020).

(Continued)

*Primary Examiner* — Daniel Abebe
(74) *Attorney, Agent, or Firm* — K&L Gates LLP

(57) ABSTRACT

The present disclosure relates to systems and methods for providing subtitle for a video. The video's audio is transcribed to obtain caption text for the video. A first machine-trained model identifies sentences in the caption text. A second model identifies intra-sentence breaks with in the sentences identified using the first machine-trained model. Based on the identified sentences and intra-sentence breaks, one or more words in the caption text are grouped into a clip caption to be displayed for a corresponding clip of the video.

15 Claims, 20 Drawing Sheets

(56) References Cited

U.S. PATENT DOCUMENTS

| | | | |
|---|---|---|---|
| 10,930,263 B1* | 2/2021 | Mahyar | G10L 15/16 |
| 2005/0022252 A1 | 1/2005 | Shen | |
| 2007/0061352 A1 | 3/2007 | Dimitrova et al. | |
| 2013/0124984 A1 | 5/2013 | Kuspa | |
| 2014/0039871 A1 | 2/2014 | Crawford | |
| 2018/0213289 A1 | 7/2018 | Lee et al. | |
| 2019/0034528 A1 | 1/2019 | Lintz | |
| 2020/0169591 A1* | 5/2020 | Ingel | G10L 13/08 |
| 2020/0211530 A1* | 7/2020 | Zass | H04N 21/4394 |
| 2021/0019369 A1 | 1/2021 | Sharma et al. | |
| 2021/0064327 A1 | 3/2021 | Ispahani | |
| 2021/0133459 A1 | 5/2021 | Wang et al. | |
| 2021/0352380 A1* | 11/2021 | Duncan | G10L 15/26 |

FOREIGN PATENT DOCUMENTS

| | | |
|---|---|---|
| CN | 110798733 A | 2/2020 |
| CN | 112183084 A | 1/2021 |
| KR | 101996551 B1 | 6/2019 |
| WO | 2004093078 A1 | 10/2004 |
| WO | 2004100164 A1 | 11/2004 |
| WO | 2014117553 A1 | 8/2014 |
| WO | 2021197428 A1 | 10/2021 |

OTHER PUBLICATIONS

Bedapudi, "DeepCorrection2: Automatic punctuation restoration", Medium, Nov. 24, 2018, retrieved on Apr. 18, 2022 from <https://praneethbedapudi.medium.com/deepcorrection2-automatic-punctuation-restoration-ac4a837d92d9>.

Song et al., "Inter-Sentence Segmentation of YouTube Subtitles Using Long-Short Term Memory (LSTM)", Applied Sciences (2019), vol. 9, No. 1504.

* cited by examiner

FIG. 9B

| so | even | though | we | face | the | difficulties | of |
|---|---|---|---|---|---|---|---|
| 00:00,175 | 00:00,750 | 00:01,687 | 00:03,011 | 00:03,700 | 00:04,537 | 00:05,055 | 00:06,450 |
| 00:00,375 | 00:01,400 | 00:02,315 | 00:03,444 | 00:04,127 | 00:04,950 | 00:06,123 | 00:06,880 |

| today | and | tomorrow | i | still | have | a | dream |
|---|---|---|---|---|---|---|---|
| 00:07,170 | 00:08,051 | 00:08,800 | 00:10,000 | 00:10,875 | 00:11,730 | 00:12,490 | 00:12,990 |
| 00:07,940 | 00:08,600 | 00:09,090 | 00:10,310 | 00:11,345 | 00:12,215 | 00:12,690 | 00:13,720 |

| it | is | a | dream | deeply | rooted | in | the |
|---|---|---|---|---|---|---|---|
| 00:14,017 | 00:14,817 | 00:15,432 | 00:16,340 | 00:17,417 | 00:18,784 | 00:19,780 | 00:20,123 |
| 00:14,427 | 00:15,110 | 00:15,730 | 00:17,045 | 00:18,215 | 00:19,011 | 00:19,170 | 00:20,870 |

...

| be | self-evident that | all | men | are | created | equal |
|---|---|---|---|---|---|---|
| 00:33,659 | 00:34,459 | 00:36,555 | 00:37,979 | 00:39,387 | 00:41,111 | 00:42,230 | 00:44,077 |
| 00:34,050 | 00:35,888 | 00:37,127 | 00:38,345 | 00:40,227 | 00:41,850 | 00:43,730 | 00:45,050 |

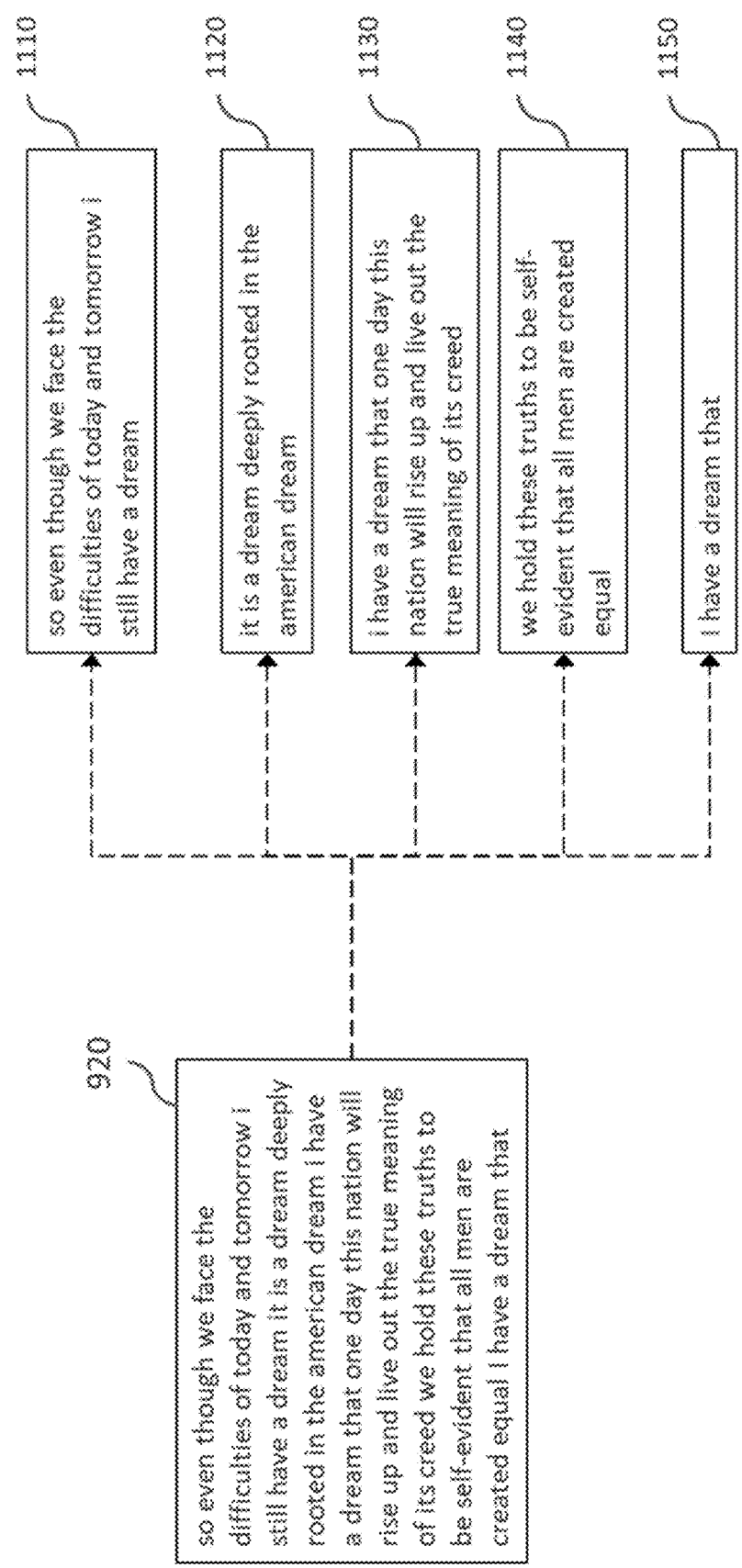

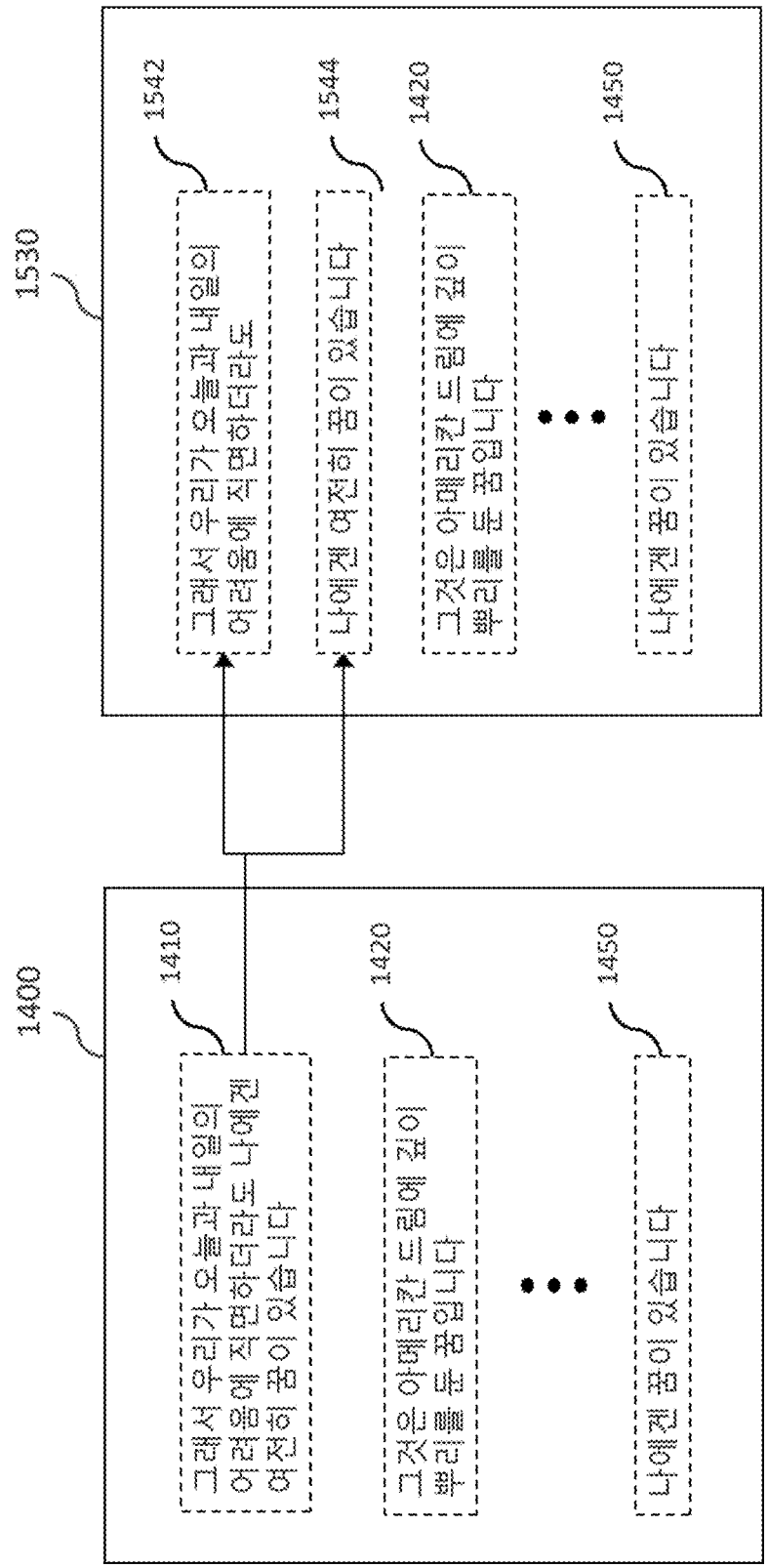

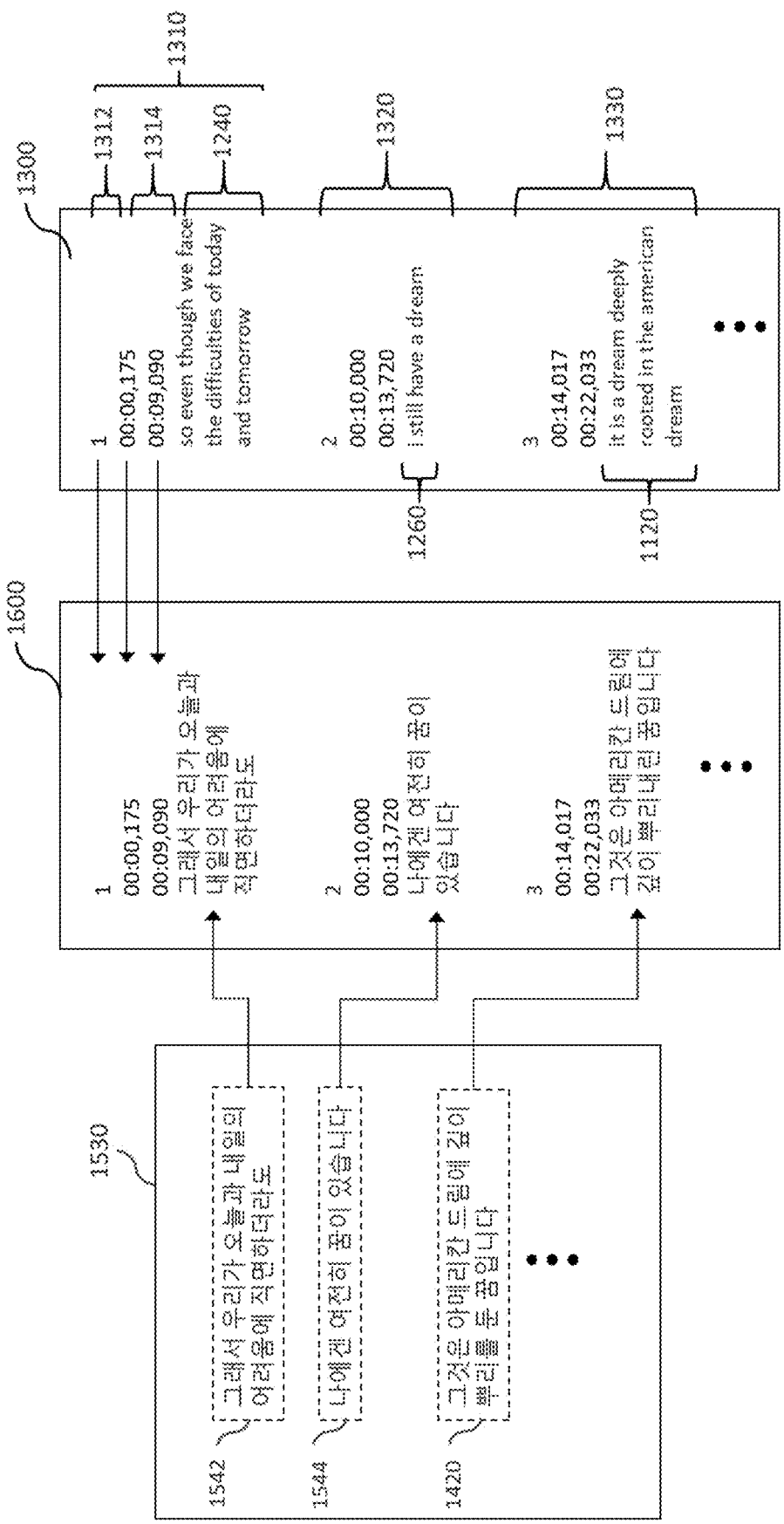

PROVIDING TRANSLATED SUBTITLE FOR VIDEO CONTENT

BACKGROUND

The present application relates to systems and methods for providing subtitle for a video.

SUMMARY

One aspect of the present disclosure provides a method of providing subtitle for a video. The method comprises one or more of the steps of: processing audio data of a video to generate a timed script in a first language which comprises a first sequence of words and a time stamp for each word of the first sequence of words; processing the first sequence of words to compute, using a first machine-trained model, a sentence-ending probability for each word of the first sequence of words; determining a first word of the first sequence as a first sentence-ending word based on the sentence-ending probability of the first word, which defines a first sentence that ends with the first word; processing the first sentence to compute, using a second machine-trained model, an intra-sentence break probability for at least one word of the first sentence; determining a second word of the first sentence as a clip-ending word based on the intra-sentence break probability of the second word, which defines a first clip text that ends with the second word, wherein defining of the first clip text further defines a first clip period that corresponds to the first clip text and ends at a time when the second word has been spoken in the video; and generating first language subtitle data comprising the first clip text and information indicative of the first clip period during which the first clip text is to be displayed as subtitle in the first language.

In embodiments, the method further comprises determining a third word of the first sentence as another clip-ending word based on the intra-sentence break probability of the third word, which defines a second clip text that begins with a word immediately following the second word and ends with the third word, wherein defining of the second clip text further defines a second clip that corresponds to the second clip text and ends at a time when the third word has been spoken in the video.

In embodiments, the timed script does not include a punctuation mark indicating the first sentence's end or an intra-sentence break in the first sentence.

In embodiments, the first machine-trained model is trained using a plurality of punctuated texts each including one or more sentence-ending punctuation marks such that the first machine-trained model is configured to compute, for at least one word in an input text, a probability that at least one sentence-ending punctuation mark would immediately follow.

In embodiments, the second machine-trained model is trained using a plurality of punctuated sentences each including one or more intra-sentence break punctuation marks such that the second machine-trained model is configured to compute, for at least one word in an input sentence, a probability that at least one intra-sentence break punctuation mark would immediately follow.

In embodiments, the at least one sentence-ending punctuation marks comprises one of period, question mark, exclamation mark and ellipsis, wherein the at least one intra-sentence break punctuation mark comprises one of comma, colon, semi-colon and ellipsis.

In the method, processing audio data of the video to generate the timed script may comprise performing a speech-to-text (STT) processing of the audio data in which audio corresponding to the second word is transcribed to the second word, the time when the second word has been spoken in the video is determined, and the time when the second word has been spoken is specified in the timed script for the second word. The information indicative of the first clip period may comprise the time when the second word has been spoken determined by the STT processing. Generating the first language subtitle data may comprise associating the time when the second word has been spoken, determined by the STT processing, with the first clip text as the first clip period's end according to a predetermined subtitle file format.

In the method, processing audio data of the video to generate the timed script may comprise one of more of the steps of: identifying silence and non-silence sound in the audio data, wherein the non-silence sound comprises the second word's corresponding sound; transcribing the second word's corresponding sound to the second word to obtain the first sequence of words; determining, for the second word, an end time when second word's corresponding sound ends in the video; and including the determined end time as the second word's time stamp in the timed script.

In the method, processing audio data of the video to generate the timed script may comprise one or more steps of: obtaining a pre-written script of the video, wherein the pre-written script comprises the first sequence of words but does not comprise a time stamp for the first sequence of words; locating, for each word in the first sequence of words, a corresponding sound in the audio data which identifies a first sound corresponding to the second word; determining an end time of the first sound when the first sound ends in the video; and combining the determined end time and the first sequence of words to generate the timed script such that the determined end time is specified as the second word's time stamp.

In the method, the timed script may comprise the second word's time stamp indicative of the time when the second word has been spoken in the video, and generating the first language subtitle data may comprise specifying the second word's time stamp as the first clip period's end according to a predetermined subtitle format. In embodiments, the first clip text starts with a third word of the first sentence, the timed script comprises the third word's time stamp indicative of the time when sound of the third word starts in the video, and generating the first language subtitle data comprises specifying the third word's time stamp as the first clip period's start according to the predetermined subtitle format.

In embodiments, the first language subtitle data is configured to such that the first clip text, in its entirety, appears as subtitle of the video at the first clip period's start and is maintained without an interruption until the first clip period's end.

In embodiments, the first clip text further includes a fourth word between the third word and the second word, wherein the first language subtitle data does not include the fourth word's time stamp such that the first clip text is displayed as subtitle without referencing to the fourth word's time stamp.

In the method, the information indicative of the first clip period may comprise a first time stamp indicating the first clip's start time in the video, and may further comprise a second time stamp indicating the first clip's end time in the video such that the first clip text is to be displayed without an interruption from the first clip's start time to the first clip's end time together with the video.

In the method, the time stamp for each word may define a time at which sound of the word ends in the video. The time stamp for each word defines a time at which sound of the word begins in the video.

In embodiments, the method further comprises one or more of the steps of: translating the first sentence into a first translated sentence in a second language, the first translated sentence ending with a first translated word; processing the first translated sentence to compute, using a third machine-trained model, an intra-sentence break probability for at least one word of the first translated sentence; determining a second translated word of the first translated sentence as a clip-ending word based on the intra-sentence break probability of the second translated word, which defines a first translated clip text that ends with the second translated word; and generating second language subtitle data comprising the first translated clip text and information indicative of a second language period during which the first translated clip text is to be displayed as subtitle in the second language. In embodiments, the first clip period for displaying the first clip text is identical or substantially identical to the second language period for displaying the first translated clip text regardless of whether the second word ending the first clip text corresponds to the second translated word ending the first translated clip text in meaning.

In embodiments, the first translated clip text in the second language may not correspond to the first clip text in the first language in meaning. The first translated clip text may be a translation of the first clip text.

In embodiments, generating the second language subtitle data comprises specifying the time when the second word has been spoken in the first language as the second language period's end such that the first clip period and the second language period end at the same time.

In embodiments, the timed script comprises the second word's time stamp indicative of the time when the second word has been spoken in the video, and generating the second language subtitle data comprises specifying, in the second language subtitle data, the second word's time stamp as end of the first clip period and the second language period according to a predetermined subtitle format.

In embodiments, the first clip text starts with a third word of the first sentence and the first translated clip text starts with a third translated word of the first translated sentence, the timed script comprises the third word's time stamp indicative of the time when sound of the third word starts in the video, and generating the second language subtitle data further comprises specifying, in the second language subtitle data, the third word's time stamp as start of the first clip period and the second language period such that the first clip period and identical to the second language period regardless of whether the third word corresponds to the third translated word in meaning.

In embodiments, the first translated sentence does not include a punctuation mark that indicates an intra-sentence break in the first translated sentence, and the third machine-trained model is trained using a plurality of punctuated sentences in the second language such that the third machine-trained model is configured to compute, for at least one word in an input sentence, a probability that at least one intra-sentence break punctuation mark would immediately follow.

In embodiments, the first sentence is divided into an "n" number of clip texts at least based on the first word and the second word when "n" is a natural number greater than "2", and the first translated sentence is divided into the same "n" number of translated clip texts.

In embodiments, the method further comprises one of determining a third word of the first sentence as a clip-ending word, which defines a second clip text that begins with a word immediately following the second word and ends with the third word. In embodiments, defining of the second clip text further defines a second clip that corresponds to the second clip text and ends at a time when the third word has been spoken in the vide, and the third word in the first sentence is identified as a clip-ending word based on one at least one of the intra-sentence break probability of the third word and a length of silence that follows the third word's sound in the video.

In embodiments, the first language subtitle data is configured to such that the first clip text, in its entirety, appears as subtitle of the video at the first clip period's start and is maintained without an interruption until the first clip period's end. In embodiments, the second language subtitle data is configured to such that the first translated clip text, in its entirety, appears as subtitle of the video at the second language period's start and is maintained without an interruption until the second language period's end.

BRIEF DESCRIPTION OF THE DRAWINGS

FIG. 9B shows an example timed script in which time codes are added to the transcribed text of FIG. 9A.

FIG. 11 is shows example sentences identified from the transcribed text of FIG. 9A.

FIG. 15B shows dividing a translated sentence into two translated clip texts.

FIG. 16 shows an example of generating translation subtitle data using translated clip texts of FIG. 15B.

Figure 1:
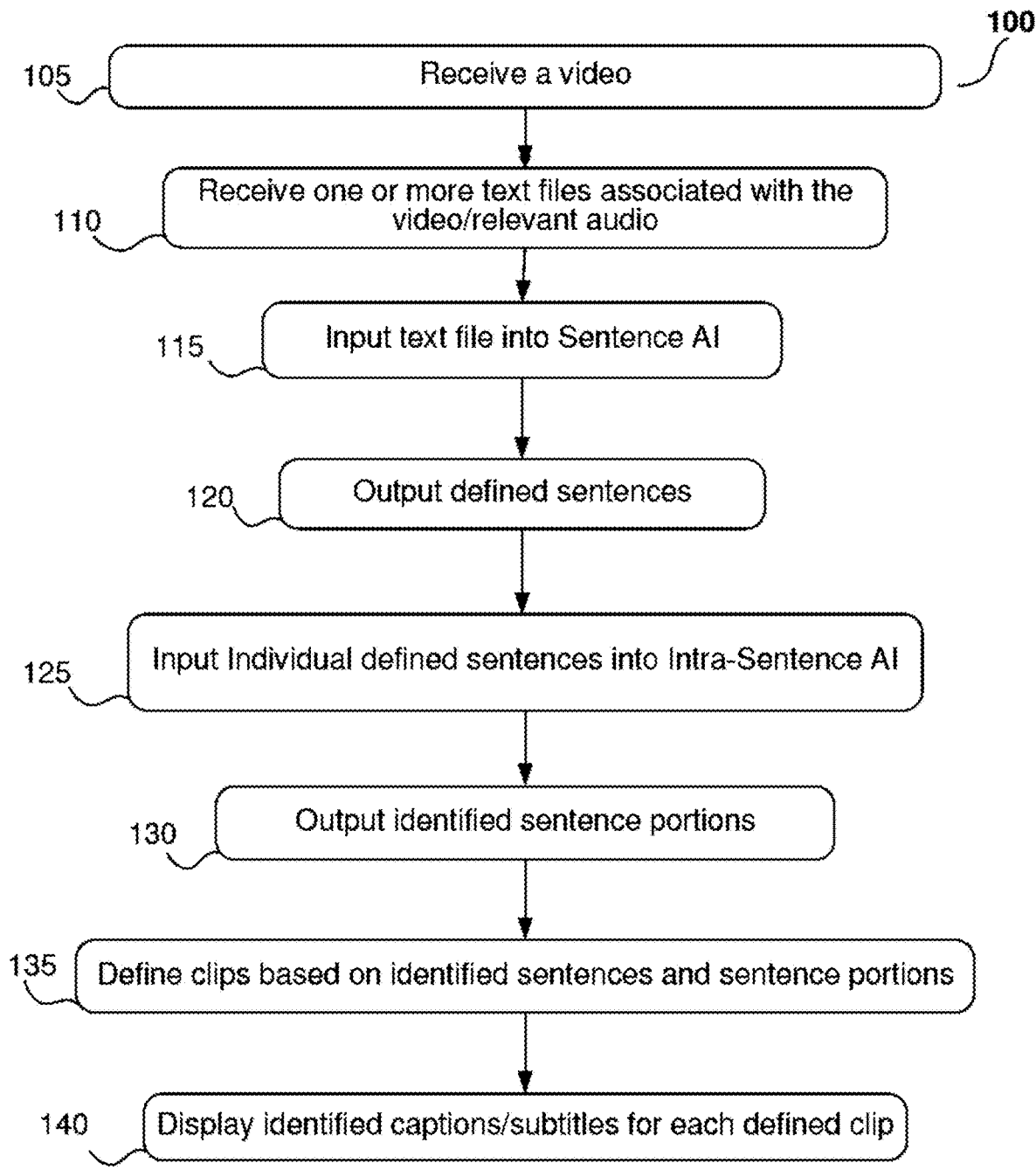
FIG. 1 is a flow chart representation of one embodiment of providing subtitle for a video.

The accompanying drawings, where like reference numerals refer to identical or functionally similar elements throughout the separate views, together with the detailed description below, are incorporated in and form part of the specification, and serve to further illustrate embodiments of concepts that include the claimed disclosure and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Hereinafter, implementations of the present invention will be described with reference to the drawings. These implementations are provided for better understanding of the present invention, and the present invention is not limited only to the implementations. Changes and modifications apparent from the implementations still fall in the scope of the present invention. Meanwhile, the original claims constitute part of the detailed description of this application.

Need for Providing Video Subtitle

Many creators are monetizing their videos on platforms like YouTube. It is important for creators to reach out more audience because they can make more money when they have more view of their video. Providing a subtitle is a way to attract more audience. However, creating a subtitle may require a lot of labor and time without using an automated technology.

Presented Technologies

The present application discloses solutions, systems, and methods for generating, handling and presenting a subtitle of a video (target video). The solutions, systems, and methods presented in the present application are collectively referred to herein as "the technologies" or "the presented technologies".

Non-limiting Implementations

Hereinafter, implementations (embodiments) of the technologies will be described with reference to the drawings. The technologies are not limited to the described implementations. Changes and modifications apparent from the described implementations still fall in the scope of the technologies.

Drawings to Show Non-limiting Examples

The drawings will be described in detail for understanding of non-limiting embodiments of the technologies. The drawings are for exemplification and are not intended to limit the technologies to the embodiments illustrated.

Format of Subtitle

A subtitle may be stored as a single file. Various subtitle formats can be used. For example, SubRip, SubViewer, Timed Text Markup Language (TTML), SBV (YouTube format), Distribution Format Exchange Profile (DFXP), and Web Video Text Track (Web VTT) can be used. In embodiments, the target video's subtitle may be stored using a format other than the examples, and may be stored as multiple files associates each other.

Components of Subtitle

In embodiment, a subtitle of the target video includes at least two components, (1) text to display (collectively, "caption text" of the target video) and (2) timing information (time stamp, time code) for displaying the text. The subtitle may include one or more additional components. For example, markup (bold, italic, underline), font, character size, spacing, positioning information may be included in the subtitle. In embodiments, the term "caption text" or "caption data" refers to the whole text to be displayed as subtitle of the target video.

Figure 13:
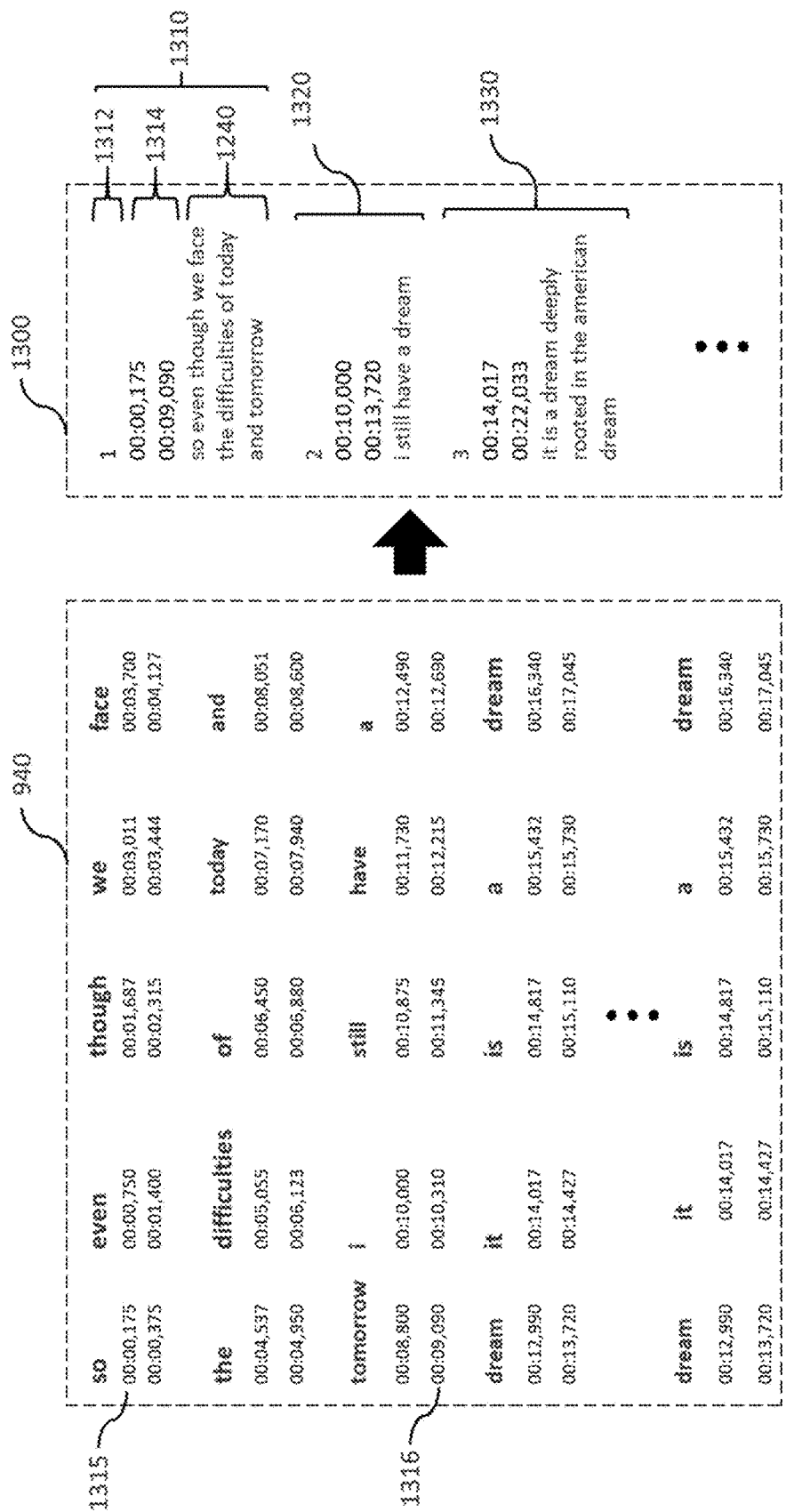
FIG. 13 is an example subtitle data generated from the timed script of FIG. 9B using two clip texts of FIG. 12B.

FIG. 13 shows an example subtitle data 1300 that includes a sequence number 1312 of a clip, a time code 1314 indicating the clip's start and end, and a clip text 1240 of the clip.

Caption Text Obtained from Video's Audio

A subtitle of a video includes texts to visualize speech or sound in the video. The technologies may obtain such texts from processing of the video's audio. The technologies may use audio recorded together with the video (live recording) and audio recorded separately from the video (dubbing, narration). In embodiments, audio that is a part of, associated with, or related to the video can be used to obtain caption text.

Speech-to-Text (STT) to Obtain Caption Text

Figure 9A:
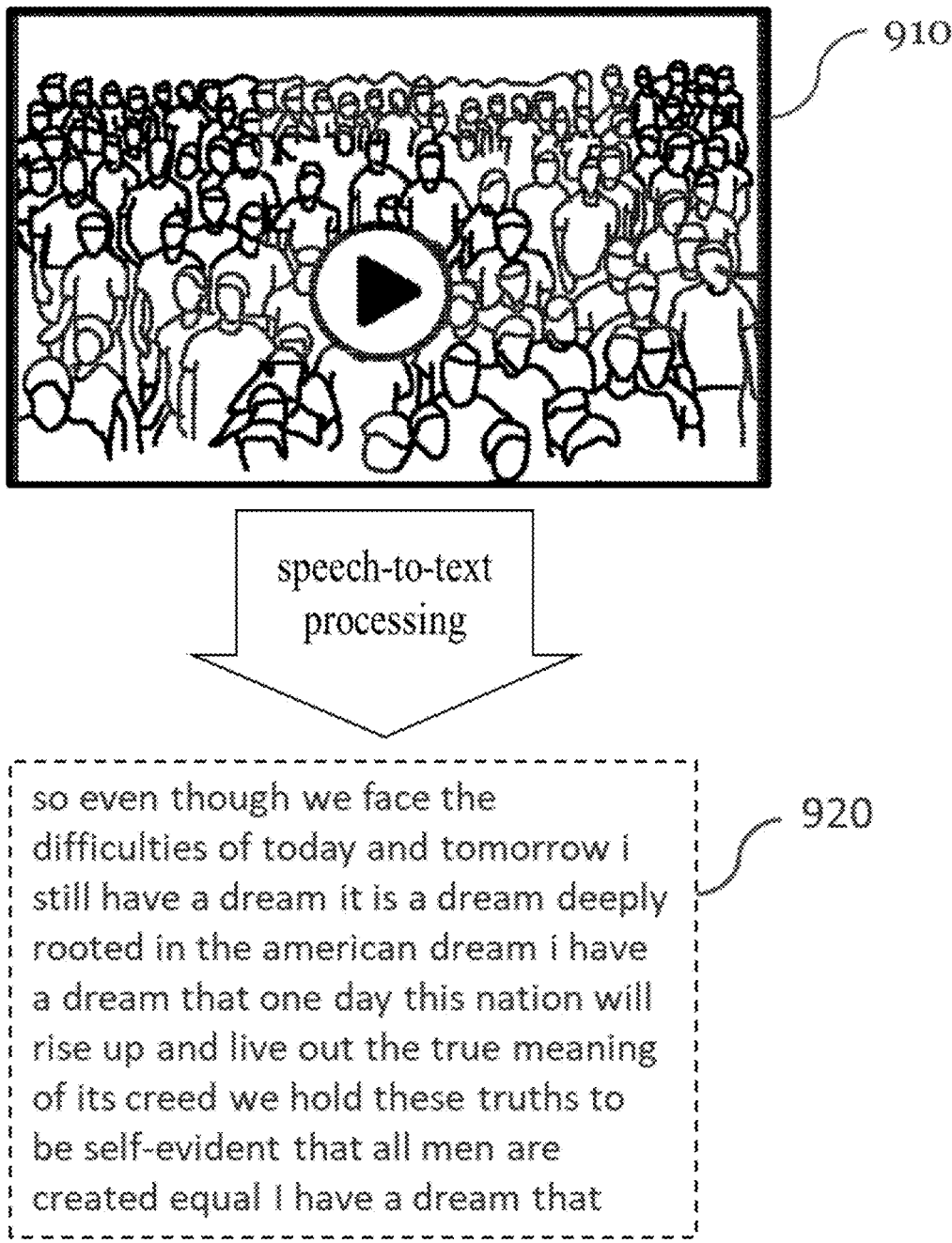
FIG. 9A shows an example transcribed text obtained from a speech-to-text (STT) processing of a video.

The technologies may use speech-to-text (STT) conversion techniques on the video's audio. The STT techniques may analyze components of the audio, remove noise from the audio, recognize one or more speeches (words) from the audio, recognize one or more languages of the speeches, and transcribe the recognized speeches into text data (STT text, or transcribed text) in the recognized language(s). The STT processing may transcribe the audio word-by-word or character-by-character to obtain a sequence of spoken words. At least part of the obtained STT text (or its modified version) can be used as caption text to visualize the recognized speeches in the video. In embodiments, audio transcription technologies different from the example can be used. FIG. 9A shows a transcribed text 920 obtained by processing audio of a video 910.

Using Pre-prepared Script

In embodiments, a screenplay or script that was prepared for shooting of the video can be used as text data (caption text) of the video's subtitle. The technologies may extract a line text from a pre-prepared screenplay of a video, determine a portion (clip) of the video that corresponds to the line texts, and display the line text as subtitle for the determined portion of the video. In embodiments, texts other than a screenplay or script can be used.

No Punctuation Mark in STT text or Pre-prepared Screenplay

In embodiments, a subtitle is generated from processing of text having punctuation mark. For a text having punctuation marks, the technologies may perform one of more of removing punctuation mark, confirming punctuation mark, and locating additional punctuation mark.

Language of Caption Data

The caption text may be of one or more languages spoken in the video. For a speech in the video, its spoken language is hereinafter referred to as "original language", or "first language".

Using Combination of Transcribed Text and Pre-prepared Script

In embodiments, a STT text (transcribed text) obtained from the video's audio, a pre-prepared script of the video, and combination of the two can be used text data (caption text) of the video's subtitle. For example, when creating subtitle based on the video's pre-prepared script, the technologies may correct (replace), add or remove one or more words in the script using one or more words in the STT text to reflect what is actually spoken in the video. For another example, when creating subtitle based on the video's pre-prepared script, the technologies may replace, add or remove one or more words in the STT text using one or more words in the script. For example, slangs spoken in the video may be replaced or removed in subtitle.

Determining Timing for Caption Text Components

For synchronization between the target video and its caption text, the technologies determine, compute or select timing for one or more words (components) of the caption text. In embodiments, the technologies determine a start time and an end time for each word of the caption text. In embodiments, timing information may be determined for one or more components other than words (for example, letters, clauses, phrases, sentences, paragraphs) of the caption text.

Determining Timing for Caption Text Based on Timing of Matching Sound

The technologies may analyze the target video's audio to identify silence (and/or noise), identify sounds (or speeches) that are separated by silence or noise, determine timing (start/end time) for identified sounds. In embodiments, the technologies determine timing for one or more words in a given script (caption text) that has no timing information. The technologies may identify a matching sound in the target video based on a simulated pronunciation of the words, and determine the sound's start time and/or end time as timing of the word(s). In embodiments, the technologies determine timing of a caption text word when transcribing target video's audio. The technologies may use a speech's start time as the start time of the speech's transcribed text, and use the speech's end time as the end time of the transcribed text. In embodiments, timing of a caption text's component (character, word, phrase) may be determined based on timing of the component's corresponding sound in the target video using a process other than the examples.

Format of Timing Information

In embodiments, timing information of a caption text's component may be stored using one or more of time from the target video's start, time to the target video's start, frame number, and a code capable of indicating a particular time in the target video. In embodiments any data format that is capable of indicating a time point or segment in the target video cab be used.

Timed Script

Caption text and associated timing information are collectively referred to hereinafter as "timed text data" or "timed script"). A timed script may be a single text file containing a sequence of words (caption text) and timing of each word in the target video. In embodiments, a timed script may be stored using file format other than text and may be stored using multiple files. FIG. 9A shows a transcribed text 920 obtained by processing audio of a video 910. FIG. 9B shows an example timed script 940 in which timing information is added for each word in the transcribed text 920. In the timed script 940, the word "dream" 952 is associated with a start time 954 and an end time 956 of its corresponding sound.

Adjusting Time Code in Timed Script to Synchronize with Video's Audio

When a script having time codes is given, the technologies may adjust or confirm the time codes such that words in the script are in sync with their corresponding sounds in the video.

Clip and Clip Cation

The technologies may process the timed script to determine a clip (portion) of the target video for presenting subtitle, and to determine a corresponding text (clip cation) to display as subtitle for the clip. The term "clip" (or "video clip") refers to a portion (or a time period) of the video that is to display (or maintain) the same subtitle text. The term "clip caption" (or "clip text") refers to text to be displayed as subtitle for the corresponding clip.

Same Caption Maintained During Clip

In embodiments, the whole clip caption appears at the beginning of the clip, remains during the clip, and disappears at the end of the clip. The same clip caption (clip text) may be displayed without change or interruption throughout the clip. In embodiments, a visual effect or markup (bold, italic, underline) can be applied only for a portion of a single clip while maintaining the same text characters. In other embodiments, words in a single clip caption appears sequentially according to their individual timing information (time code) such that the whole clip caption appears at an ending portion of the clip. In embodiments, clip caption can be displayed in a way different from the examples as long as the whole clip caption is displayed at least at a point of the clip.

Defining Clip Using Timing of Clip Text

In embodiment, the technologies define a clip caption first, and then define a corresponding clip based on timing information of the determined clip caption. For example, when a clip caption is defined to have a beginning word and an ending word, the beginning word's start time (time code) is determined as the clip's start time, and the ending word's end time (time code) is determined as the clip's end time. Adjustment of a predetermined time may be applied to determine the clip's start time based on timing of the beginning word and to determine the clip's end time based on timing of the ending word. In embodiment, the technologies may define a clip first and define its clip caption to include all texts of corresponding time period.

Clip Caption by Words

In embodiments, a clip caption (a single clip) is defined to include one or more words. A single word may not be separated into two clips. In embodiments, a single clip includes a fragment of a word when only the fragment was spoken in the video or when there is a long silence between the fragment spoken and the other following fragment(s) of the word. In embodiments, a clip caption may be defined using a higher grammatical unit (phrase, clause, sentence).

Grouping Words to Define Clip/Clip Cation

In embodiments, the technologies group two or more consecutive words in the caption text as clip caption (clip text) of a single clip. Words may be grouped by sentence such that two words in a single sentence are included in a single clip caption. In embodiments, two words in a sentence may be separated into two clip captions when there is a long silence between the two words or when the sentence is too long for a single clip. In embodiments, a single clip may contain words of two different sentences. In embodiments, a grammatical unit other than sentence (phrase, clause) or a segment of caption text other than grammatical unit may be used to group words.

Identifying Grammatical Units/Segments

In embodiments, the technologies may process the caption text to identify grammatical units (word, phrase, clause, sentence) or other segments in the caption text. In embodiments, the technologies may refer to punctuation marks (periods, question marks, exclamation marks, commas, etc.) in a script given as the caption text to identify grammatical units or other segments. In embodiments, the technologies may to determine potential location of punctuation marks for a STT text having no punctuation marks. Example processes to identify grammatical units or other segments in the caption text will be described later in the present disclosure.

Machine-Trained Model to Identify Sentence

In embodiments, a machine-trained sentence-identifying model (hereinafter "sentence model" or "sentence artificial intelligence") is used to identify one or more sentences in the caption text (caption data). A sentence model is to process the caption text and to locate beginning and/or ending of one or more sentences in the caption text. In embodiments, techniques other than a machine-trained model can be used.

Input of Sentence Model — Word Sequence

In embodiments, a sentence model is configured to receive, as its input, a predetermined number of words (for example, 200 words). In embodiments, the caption text (STT text, pre-written script) is divided into several smaller sequences of words to meet a predetermined requirement for input of the sentence model. When a word sequence is shorter than the predetermined number, one or more dummy words or null value may be inputted together with the word sequence. In embodiments, sentence model may be flexible to receive inputs of different sizes. In embodiments, input data size may be defined using a unit other than the word count (for example, character count).

Pre-screening of Words

In embodiments, certain words are be removed from input text to a sentence model. For example, articles ("a", "an" and "the") may be excluded from input to a sentence model to compute as articles do not end a sentence in general. In embodiments, when a screenplay or script includes words other than line text describing a scene in the video (for example, "laughter", "background music"), such words may be excluded from input to a sentence model.

Output of Sentence Model—Probability of Sentence Ending/Starting

In embodiments, a sentence model is configured to compute, for one or more words in its input text, a probability that the word is the last word of a sentence (sentence-ending probability) and/or a probability that the word is the beginning word of a sentence (sentence-starting probability). In embodiments, a sentence-ending probability of a word represents a probability that certain sentence-ending punctuation mark would follow the word. In embodiments, a sentence-starting probability of a word represents a probability that the word follows a certain sentence-ending punctuation mark. In embodiments, because a word's sentence-starting probability is the same as the following word's sentence-starting probability, a sentence model for computing sentence-ending probability may be referred as a sentence model computing sentence-starting probability. According to FIG. 10, a sentence model 1010 computes sentence-ending probabilities 1020 (in percentage) for each word in the input text 920. The word 1022 has a sentence-ending probability of 99 percent.

Sentence Ending Probability for Each Punctuation Mark

In embodiments, a sentence model is used to compute, for a single word, multiple sentence-ending probabilities respectively for the sentence-ending punctuation marks (period, question mark, exclamation mark, ellipsis). The presented technology may add the multiple sentence-ending probabilities to compute a representative sentence-ending probability, or take the highest among the multiple sentence-ending probabilities. In embodiments, separate sentence models may be used for different sentence-ending punctuation marks.

Adjusting Sentence Model Output

In embodiments, a sentence-ending probability (or a sentence-starting probability) computed by a sentence model can be adjusted based on various factors. A predefined default probability value of the word itself, a particular neighboring word, presence of well-known or established phrases, or certain grammatical tools or techniques can be used for adjusting.

Predetermined Threshold to Determine Sentence Ending Words

Figure 10:
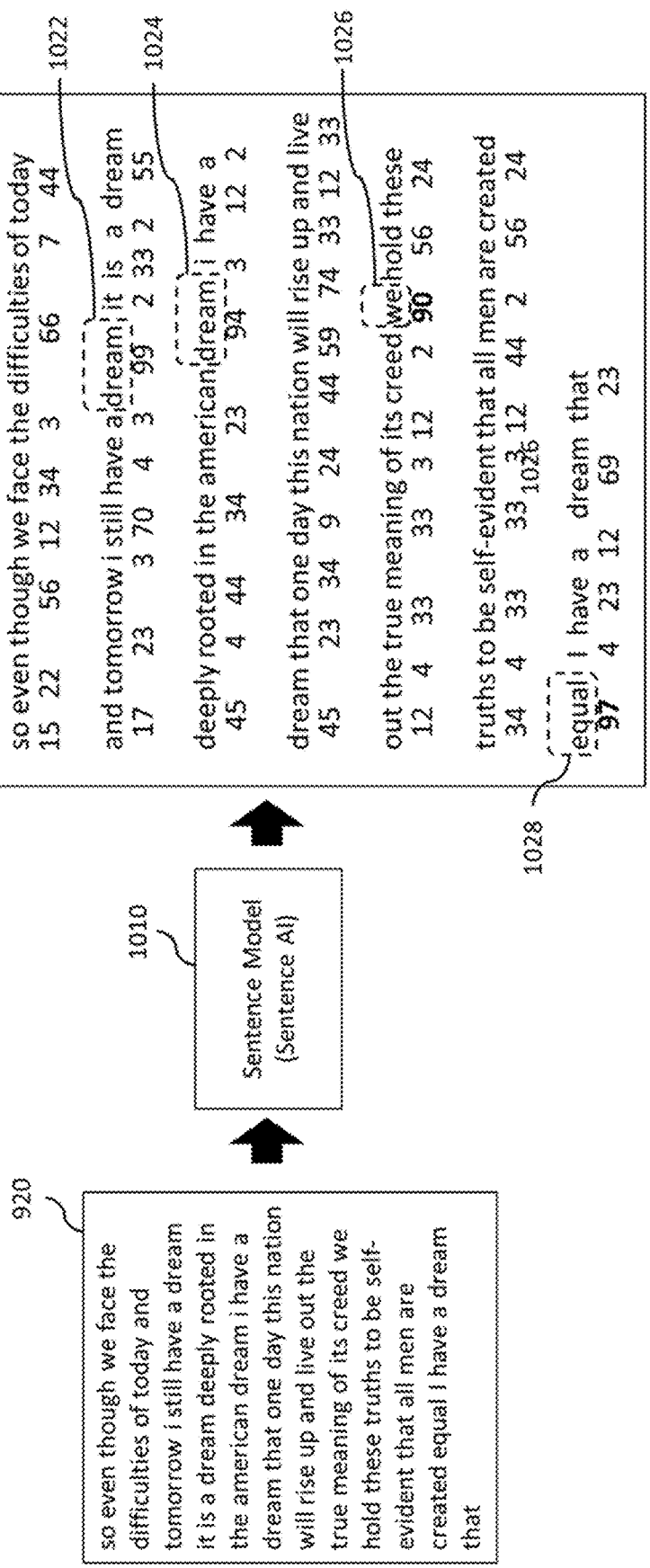
FIG. 10 is an example of computing sentence-ending probability for words in the transcribed text of FIG. 9A.

In embodiments, when a word's sentence-ending probability is greater than a pre-determined threshold, the word is determined as a sentence ending word. The threshold may be specific to one or more words, be universal across all words, be set or be adjusted by the sentence model, be set manually by a user, or by the administrator or programmer of the software. The threshold may be different for the word and for its translation, or be uniform across the languages (same for the word and for all translations). In embodiments, a sentence-ending word may be determined using one or more criterion other than a predetermined threshold. In FIG. 10, when the threshold is 90 percent, four words 1022, 1024, 1026, 1028 are identified as sentence ending words.

Determining Sentences by Sentence Ending Word

In embodiments, in the caption text, a word immediately following a sentence-ending word of a sentence may be determined as a sentence-starting word of the next sentence. The very first word of the caption text data is another sentence-starting word. One or more words from a sentence-starting word to an immediately following sentence-ending word constitute a sentence. While a sequence of words can be identified as a sentence, the identified sentence may not be a grammatically complete sentence. In FIG. 11, the STT text 920 is divided into five segments 1110-1150 based on the four sentence-ending words 1022-1028. Four sentences 1110-1140 are identified. In embodiments, the last segment 1150 is combined with a starting porting of another STT text immediately following the STT text 920 to form a complete sentence (or clip) such that the segment's starting word "I" is used as a clip-staring word.

Defining Clip by Sentence

In embodiments, a clip caption (clip text) and its corresponding clip may be defined to include all words of one or more complete sentences. For example, each of the four sentences 1110-1140 in FIG. 11 may be defined as clip text for a single clip respectively.

When a sentence is defined as clip text of a single clip, the clip (clip period) can be defined using timing information of the sentence's starting word and ending word. The starting word's start time (time stamp, time code) may be used as the clip's start time, and the ending word's end time (time stamp, time code) may be used as the clip's end time. For example, the first sentence 1110 in FIG. 11 is used as clip text for a single clip, the start time "00:00,175" 984 of the starting word "so" 982 is used as the clip's start, and the end time "00:00,720" 956 of the ending word "dream" 952 is used as the clip's end. In embodiments, clips corresponding to individual sentences are be combined to form a longer clip, and a clip corresponding to a single sentence can be divided into two or more clips based on intra-sentence breaks within the sentence.

Timing Adjustment of Clip

In embodiments, an adjustment can be applied such that the clip starts earlier (or later) than the first word by a predetermined time. In embodiments, an adjustment can be applied such that the clip end later (or earlier) than the last word by a predetermined time. In embodiments, the clip's start and end may be defined differently from the examples as long as it does not ruin synchronization between the clip and its corresponding sentence(s).

Intra-Sentence Break to Define Clip Caption

In embodiments, the technologies may process at least part of the caption text to identify one or more intra-sentence breaks, and define a clip cation and its corresponding clip based on the intra-sentence breaks. For example, one or more sentences identified using a sentence-model is further analyzed to identify one or more breaks within the sentences, and the identified intra-sentence breaks may be used to divide a clip includes the sentences.

Intra-Sentence Model

In embodiments, the technologies may use a machine-trained intra-sentence break identifying model (hereinafter "intra-sentence model") to identify one or more breaks within sentences of the caption text. An intra-sentence model may be configured to receive a sequence of words and to output, for each word in the input, a probability that an intra-sentence break would follow the word or the word immediately precedes an intra-sentence break (hereinafter "intra-sentence break probability").

Input of Intra-Sentence model—Sentence Identified Using Sentence-Model

In embodiments, an intra-sentence model is configured to receive, one or more sentences as its input, one or more sentences identified using a sentence-model. In embodiments, an intra-sentence model is configured to receive a portion of the caption text without referencing to sentences identified using a sentence-model. An intra-sentence model may have a maximum number of words for its input (for example, 50 words), and it may be shorter than that of the sentence-model (for example, 300 words).

Excluding Short Sentences from Input of Intra-Sentence model

In embodiments, when a sentence is short than a predetermined length (for example, character count) allowed for a single clip, there may be no need to separate the sentence into two or more clips and the sentence may be excluded from input of an intra-sentence model.

Output of Intra-Sentence model—Intra-sentence Break Probability

In embodiments, an intra-sentence break probability of a word represents a probability that the word immediately precedes (or follows) one or more of intra-sentence punctuation marks (for example, comma, dashes, ellipses, semi-colons, etc.) indicating intra-sentence break. In embodiments, an intra-sentence break probability of a word represents a probability that the word is the last word (or the first word) of a phrase or clause.

Various Intra-sentence model probability embodiments

In embodiments, the intra-sentence model assigns different probability values for each word based on their probability to be immediately precede different types of an intra-sentence break punctuation mark, for example, a 70% probability that the punctuation mark following the word is a comma, 80% probability it is an ellipses, and 90% probability that the punctuation mark may be a semi-colon, and then the intra-sentence model selects the mark with the highest probability for that word, i.e., a semi-colon for the word in this case.

In embodiments, intra-sentence model just assigns a probability score to each word for being an intra-sentence break word based on its probability that is would be adjacent or immediately preceding a comma, regardless of what the punctuation mark following the word may be and assigns a single probability score for each word in the examined sentence.

Depending on the embodiment, the intra-sentence model may select the mark with the highest probability for each word, or may assign the punctuation probability of each word based on the highest probability punctuation mark, i.e., an exclamation mark in this case. In embodiments, the sentence model is able to compare the different probabilities of each word to be immediately preceding a variety of punctuation marks as well and use all these comparisons against the variety of probability scores of each of the other words in the text.

Figure 12A:
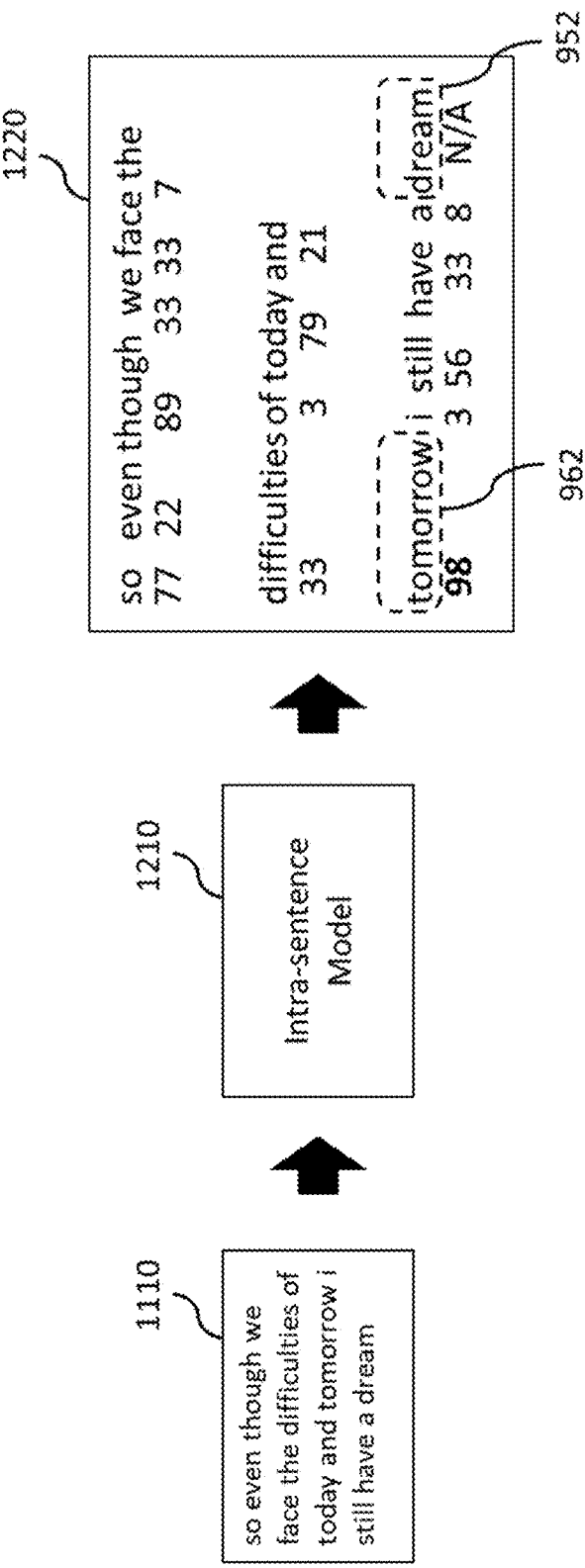
FIG. 12A shows identifying a clip ending word in an example sentence of FIG. 11 based on intra-sentence break probability.

According to FIG. 12A, an intra-sentence model 1210 computes intra-sentence break probabilities 1220 (in percentage) for words in the input sentence 1110. The model 1210 did not compute an intra-sentence break probability for the word 952 as it is the sentence-ending word.

Dividing Clips Defined by Sentence

In embodiments, a clip defined to include or encompass one or more sentences identified using the sentence-AI is may be divided into two or more clips by one or more the intra-sentence breaks identified using the intra-sentence model. In certain embodiments, clips may be defined after identifying intra-sentence breaks using time stamp information of sentence endings and intra-sentence breaks.

In embodiments, the intra-sentence model is to determine segments or portions in a sentence, by determining the location of intra-sentence breaks, preferably by determining the position of words that immediately precede a comma. These sentence segments or portions may be divided by intra-sentence punctuation marks as discussed above, or in alternative embodiments by spaces, pauses, or other determinations the intra-sentence model makes.

In embodiments, these intra-sentence breaks defining sentence portions or segments then may be used to mark the location of the intra-sentence breaks in the STT text, text file and/or their corresponding location in the video clip and/or audio file, whereas clips defined by the sentences may be further timestamped and/or further divided into additional clips.

Determining Intra-Sentence Break—Threshold

In embodiments, for a word to be considered to be at a specific position in a sentence, for example an intra-sentence break word, or the word immediately preceding an intra-sentence break that may be defined by an intra-sentence punctuation mark, its intra-sentence break probability needs to meet or exceed a predetermined threshold. In FIG. 12A, when the threshold is 90%, the word 962 having 98% intra-sentence break probability is identified as an intra-sentence break word.

This threshold may be pre-defined for each word, be universal across all words, be set or be adjusted by the sentence model, be set manually by a user, or by the administrator or programmer of the software. The threshold may also be different for different languages, for example in English the specified threshold for a word to be considered as the last before an intra-sentence break may be assigned an intra-sentence break probability of 85% or assigned score of 85, but in Korean, it may be set at 80% or a score of 80. This threshold may be specific to one or more words, or may be uniform to all the words across the language. When a word's assigned comma or punctuation probability meets the pre-defined threshold value, then it is considered a last word in a sentence segment by the intra-sentence model, or in various other embodiments as occupying a specific position in a sentence.

Adjusting Threshold Comma/Punctuation Probability Values

In embodiments, the intra-sentence model may determine or adjust the punctuation probability threshold value. Threshold values may be different for different words, positions or spaces, or be universal across all words in the language.

Using Intra-sentence Break Word as Clip-ending Word

Figure 12B:
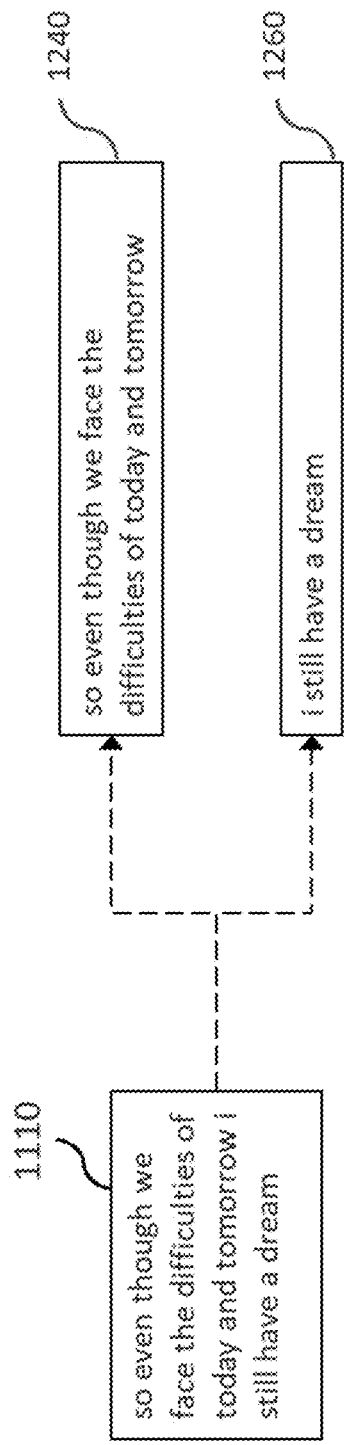
FIG. 12B is an example of dividing an example sentence of FIG. 11 in to two clip texts.

In embodiments, the technologies use an intra-sentence break word as a clip-ending word such that a sentence identified in a STT text is partitioned into two or more clip texts. According to FIG. 12A and FIG. 12B, the word "tomorrow" 962 is identified as an intra-sentence break word and as a clip-ending word such that the first sentence 1110 of the text 920 is divided into two clip texts 1240, 1260.

Generating Subtitle Data from Timed Script

FIG. 13 shows an example subtitle data 1300 generated based on clip-ending words in the timed script 940. Among the words in the script 940, the four sentence-ending words 1022-1028 identified using the sentence model 1010 are used as clip-ending words, and the intra-sentence break word 962 identified using the intra-sentence model 1210 is also used as a clip-ending word. Further, the first word "so" 982 of the script 940 is used as a clip-staring word.

According to FIG. 13, the first sentence 1110 of the text 920 is divided into two clip texts 1240, 1260, and the second sentence 1120 remains as a single clip text. The subtitle data 1300 includes three segments 1310, 1320, 1330 each corresponding the clip texts 1240, 1260, 1120. The first segments 1310 of the clip text 1240 defines a serial number 1312 of the clip text, defines a time code 1314 defines a clip period in the video 910 during which the clip text 1240 is displayed as subtitle.

Storing Location of Intra-Sentence Breaks

The position of the identified intra-sentence break word may be marked in the text or STT file, which in turn may be linked to the position of the word (i.e., via time stamp information) in the video and/or a relevant audio (audio in the video, or a dubbed audio). As the intra-sentence model analyzes the full text file, it identifies each sentence segment ending word and marks each of their locations in the text and subsequently in the video/audio. The marked locations (time/frame in the video) are thus indicators of the end of a sentence segment, each new sentence beginning at the end of the last sentence.

Results of Intra-Sentence Identifications

Once an intra-sentence break is identified then it may be timestamped in the text, data, or STT file and may also be timestamped on the corresponding location in the video clip and its accompanying audio. Identified or timestamped locations in clips may then be used to divide the clip into further smaller clips. A clip that was initially defined by the sentence model may be further cut, marked, identified, or spliced at the identified position of the punctuation mark or specific pause into a new clip by the determination of intra-sentence breaks by intra-sentence model. Therefore, a clip that was produced by identification of a sentence ending word by the sentence model may contain one or more other sentences that may be identified by the intra-sentence model, leading to that first clip being divided into separate clips each of which having a clip caption made up of a sentence segment.

Storing Time Stamp Information of Sentence/Intra-sentence Break

In embodiments, the technologies may store or mark position of each sentence-starting word and each sentence-ending word in the caption text (for example, STT text), in the timed script, or in a separate data connected to the caption text or the timed script. By doing so, an identified sentence may be linked to a corresponding portion (clip) of the target video.

In embodiments, the technologies may store or mark position of each intra-sentence break. It may be ending time of a word immediately preceding the break, or starting time of a word immediately following the break.

Alternative Pre-defined Probabilities

In many embodiments, an association probability value or score between each word and the various punctuation marks used in the relevant language are provided, for example, a probability value for a sentence ending punctuation mark like a period, or an intra-sentence punctuation mark indicating a pause such as a comma. One or more of the already discussed AI models, or an alternative algorithm, may use these pre-provided punctuation probability values of each word to determine whether a comma or period or any other suitable punctuation mark available should be inserted in the locations adjacent to the word. Punctuation probabilities for each word may be different for each side adjacent to the word. In embodiments however, only one location adjacent to each word on the side most likely to have a punctuation mark is considered.

Post-Output Adjustments by Intra-Sentence model

In embodiments, the intra-sentence model may generate or adjust the punctuation probability values of words in the text file after its initial output. It may make adjustments based on a multitude of factors including but not limited to, default set values or punctuation probabilities for each word, the presence of punctuation marks in the input text, the presence of an identified sentence ending word, probability value of the word being a sentence ending word, and assigned probability values and punctuation probability values of other words in the text. In embodiments, the technologies may consider a silence to adjust the intra-sentence break probability. For example, when a pause or silence longer than a predetermined length follows a word, the word may have a higher intra-sentence break probability.

Using Sentence model and Intra-Sentence Model in Sequence

In embodiments, a sentence model first runs on the input text to determine an initial set of sentences to determine an initial set of derived clips from the original video, with each clip containing one complete sentence, this is then followed by a second intra-sentence model to enhance the output of the sentence model and which may identify and derive further clips requiring the splitting of already identified clips into additional clips by identifying intra-sentence breaks in the identified sentences/clips or in some circumstances combining different clips together if necessary to complete a sentence.

Using Two Separate Models

In embodiments, the technologies use two separate models—one for identifying sentences (sentence-model), and the other for identifying (intra-sentence model). An intra-sentence model is to find suitable locations within each sentence to further break down the sentence and is able to do so more accurately than the sentence model. The intra-sentence model may be able to more accurately find commas within a sentence as it is an AI model trained primarily for this purpose and provided an input of an already-defined sentences both in its training and when it is being utilized on input data. As the two AI models may have different inputs, different outputs, require different training data sets, require different training techniques to meet their objects, it may be efficient to separate the sentence model and the intra-sentence model.

Combined Sentence-intra-sentence model

In embodiments, the technologies may train a single machine-trained model to perform functions of a sentence model and an intra-sentence model. In embodiments, the technologies may train a sentence model and an intra-sentence model, and then combine the two trained model into a single model

Probability Table

In embodiments, the technologies may use a static table that includes a plurality of words, and one or more predetermined probability values for each word. The one or more predetermined probability values of a word may include one or more of the word's sentence-ending probability and the word's intra-sentence break probability.

Other Factors to Determine Sentence and Intra-sentence Break

In embodiments, when a silence (or pause) longer than a predetermined time follows a word, the technologies may determine the word as an end of sentence or increase the word's sentence-ending probability. In embodiments, a silence (or pause) longer than a predetermined time follows a word, presented technologies may increase the word's intra-sentence break probability or determine that an intra-sentence break follows the word. In embodiments, when the number of sentences in the input text is determined or known, words having highest probabilities may be selected as sentence-ending words to meet the number. The technologies may consider one or more factors other than punctuation marks to identify a sentence or an intra-sentence break, and may configure a sentence model or an intra-sentence model accordingly.

Too-Long Clip or Too-Short Clip

The length of a clip period (or a clip text) may indicate that it is too long requiring further divisions, and may indicate that it is too short requiring combining several clips. In embodiments, the technologies employ one or more of the AI models described above to split the clip into clips if the clip's length exceeds the prescribed maximum length, or combine the clip with other clips if it is under a prescribed minimum length.

For example, the intra-sentence model may be deployed on a clip that is deemed too long to further break it down into several sentence portions. Or the sentence or intra-sentence models may be utilized to combine the clips with surrounding clips whether they are other sentence segments, or other complete sentences. Users may also manually break clips or set configurations that break clips that are too long, and maximum clip lengths may be set by a user manually.

Disregarding Punctuation Marks

In embodiments, one or more identifiable punctuation marks (or intra-sentence breaks) may be disregarded when defining sentences and clips. For example, ignoring punctuation marks may happen to produce a longer clip that may include multiple punctuation marks, particularly if the punctuation marks do not strongly correspond with pauses or are not are not strong indicators of sentence ending. In embodiments, one or more identifiable punctuation marks may be disregarded when a punctuation probability of a word is not very high relative to a threshold, even if the threshold has been met.

Display Time-Limits on Clip Caption On-Screen Length

In embodiments, a time limit may be set on how long a clip caption may appear on a video clip. For example, a clip caption may be limited to be displayed on the video clip for a maximum defined period. In these instances, the caption text can be removed or the clip shortened, or divided into several clips. The caption may also have minimum time limits for which it must be displayed.

Training of Machine-trainable Model

The technologies may use various known training techniques to obtain a machine-trained model having a desirable performance. In embodiments, presented technologies may use machine learning techniques including and not limited to deep neural networks, auto-encoders, vibrational or other types of auto-encoders, and generative adversarial networks.

For example, training of a model is completed when, for each of input data of the training data set, output from the model is within a predetermined allowable range of error from the corresponding desirable output data (label) of the training data set.

Data Set for Training Machine-trainable Model

To prepare a machine-trained model, the technologies may develop or prepare a data set for training of the machine-trainable model. The training data set includes a number of data pairs. Each pair includes input data for the training machine-trainable model and desirable output data (label) from the model in response to the input data.

Training Data for Sentence Model

In embodiments, to train a sentence model to compute sentence ending probability for each word in an input text with no punctuation mark, training input data may include a sequence of words having no punctuation marks, and the correspond training output data (desirable output for the input) may be values indicating each sentence ending marks (for example, 100% for a sentence ending words and 0% for the other words). The sequence of words having no punctuation mark may be generated by removing punctuation marks from a well-punctuated text. In embodiments, training output data may be indications of particular sentence-ending punctuation marks. The training data set may be of a format different from the examples.

Training Data for Intra-Sentence Model

In embodiments, the intra-sentence model may be trained primarily on a set of well-punctuated sentences. In embodiments, training input data includes one or more complete sentences with no punctuation mark, and the correspond training output data are values indicating intra-sentence breaks with in the sentences (for example, 100% for a word having an immediately following intra-sentence punctuation mark, 0% for the other words). In embodiments, training data set may be configured differently from the example.

Model Different from a Static Table

In embodiments, a machine trained model is different from a static table of words and their corresponding probabilities in that the model can output different values for the same word. In FIG. 10, the word 1022 and the word 1024 have different sentence ending probability values while they have the same text "dream".

Language Dependency of Models

In embodiments, the technologies may train and configure separate versions of sentence model (and intra-sentence model) for different languages. To provide subtitles of a video recorded in a first language, the technologies may need to use a first-language versions of the machine-trained models. Training of a first-language model may rely primarily on a training data set in the first-language, and may use additional training data set in one or more foreign languages. In embodiments, the technologies may train a single model to handle two or more languages.

Processing of Video in view of Clip

In embodiments, the target video may be marked, bookmarked, edited or timestamped to indicate time location a clip. In embodiments, the target video is spliced into multiple parts each corresponding to the identified clips.

Translated Subtitles

In embodiments, the technologies may generate one or more translated subtitles for the target video, using subtitles generated in the target video's original audio language (spoken language, original language). As already discussed, caption text may in the original language is either provided as a script, or generated by one or more audio processing technique (STT) or other AI methods. The caption text may in the original language are translated into a desired foreign language (the language the caption texts are translated into is referred to hereinafter as the "translation language", or the "second language").

Sentence-by-Sentence Translation

Figure 14:
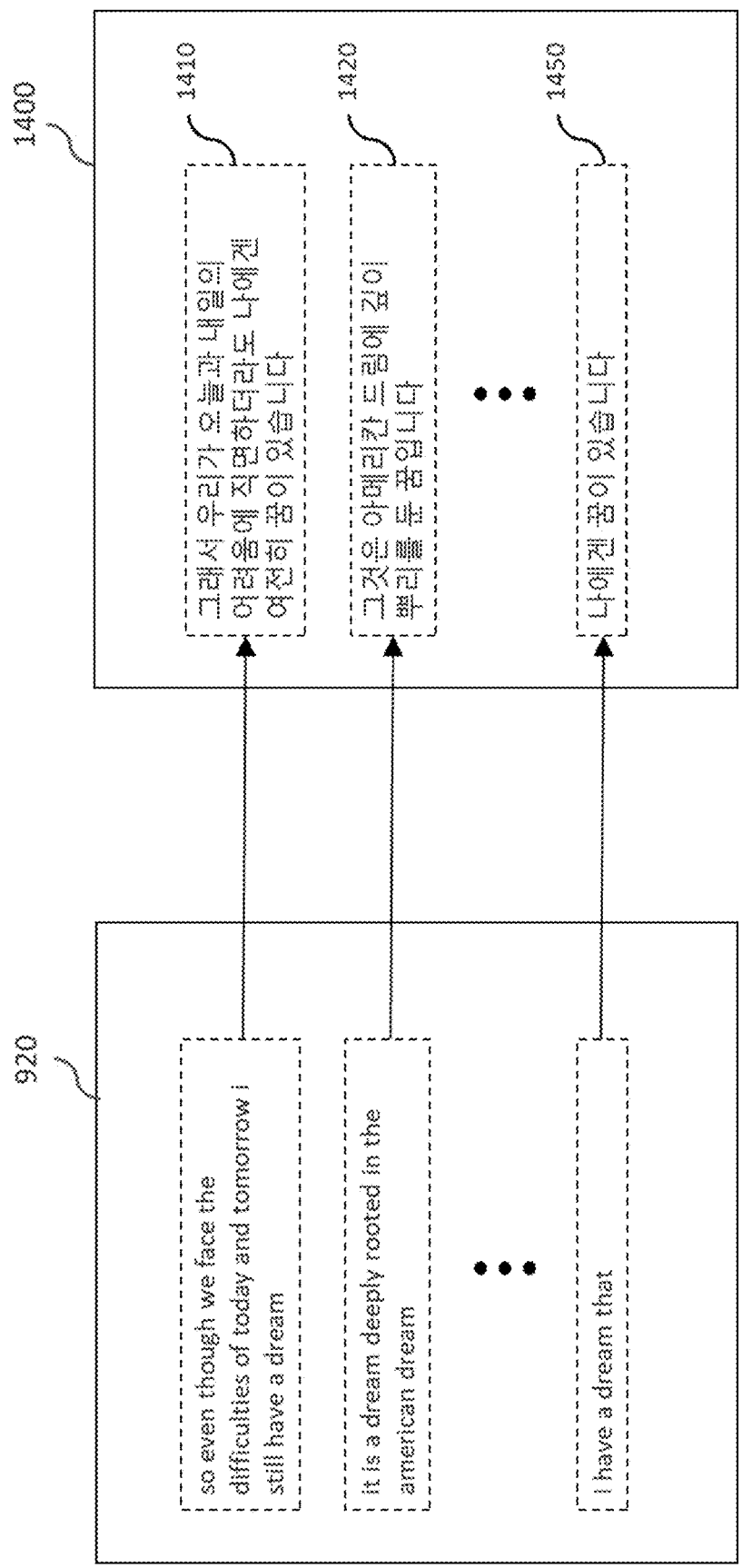
FIG. 14 shows sentence-by-sentence translation of sentences in FIG. 11.

In embodiments, the technologies translate the caption text sentence by sentence into the translation language. When the caption text in the original language comprises sentence-ending punctuation marks, sentences separated by the sentence-ending marks may be individually translated. When caption text in the original language does not have information of punctuation marks as in a STT text, the technologies perform a sentence-by-sentence translation using sentences identified using the sentence model. FIG. 14 shows a translation 1400 of the STT text 920 in Korean language. The Korean language translation 1400 includes three translated sentences 1410, 1420, 1450 respectively corresponding to the original language texts 1110, 1120, 1150.

In certain embodiments, two or more sentences may be translated together. While a sentence-by-sentence translation may use a sentence (identified sentence) as a unit of translation, it may allow two or more sentences being translated together. In embodiments, a translation unit other than sentence may be used (for example, word-by-word, phrase-by phrase, clip-by-clip or combination of different translation units).

Translated Subtitles—Clips Based on Original Language Caption Text

In embodiments, to provide translated subtitles, translated caption texts in the translation language may use or adopt the same clips ("original clips") defined based on the original-language caption texts (defined with timestamps of the original language) for synchronization with the target video's speech in the original language. As discusses above, the technologies may determine clips based on sentence endings and intra-sentence breaks identified using the sentence model and the intra-sentence models in the original language. The technologies may use the determine clips not only for subtitles in the original language but for translated subtitles.

However, in some embodiments, the technologies may process a translated caption text date to locate sentence endings and intra-sentence identified using the translation-language version of the sentence model and the intra-sentence models, and may determine clips different from those defined based on the original-language caption texts.

Assigning Translated Caption Texts to Original Clips

In embodiments, when the translated subtitles follow the original clips and a clip includes only a sentence, the translated sentence may be assigned in its entirety to the same clip. When a clip includes two or more sentence, the translated sentence may be assigned in their entirety to the same clip keeping the same order of sentences.

In embodiments, when the translated subtitles follow the original clips and a clip and a sentence is divided into two or more clips (using the sentence and intra-sentence models), the translated sentence may be divided into the same number of clips so that the original sentence and the translated sentence are in sync when the original and translated subtitles are displayed together.

Dividing Translated Sentence into Same Number of Clip Texts as Original Language Sentence In embodiments, when a sentence in the original language is divided into two or more clips in the original language subtitles, a further processing of its translated sentence may be performed as the translated sentence may not have punctuation marks or other indication to divide it into two or more of the original clips.

The technologies may deploy a third AI model for identifying intra-sentence breaks in the translated sentence. The third AI model may be a version of the intra-sentence model trained and configured in the translation language. ("translation intra-sentence model"). The translation intra-sentence model may be deployed on each translated sentence and then aims to divide the sentence into a number of sentence portions matching the number of clips that sentence is divided into in the original language.

Figure 15A:
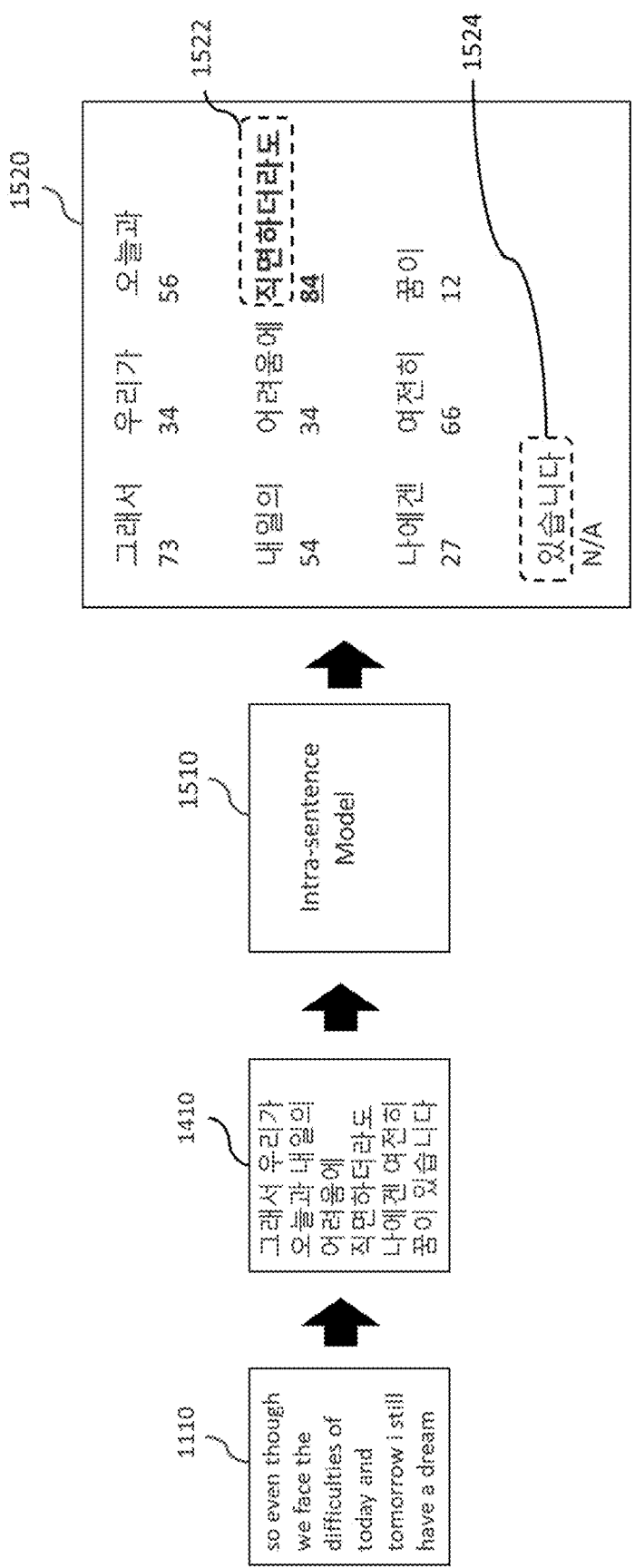
FIG. 15A shows identifying a clip ending word in a translated sentence of FIG. 14.

According to FIG. 15A to FIG. 16, an intra-sentence model 1510 (for example, Korean language version of the model 1210) computes intra-sentence break probabilities 1520 (in percentage) for words in the translated sentence 1410 of the original language sentence 1110. The model 1510 did not compute the probability for the word 1524 as it is the sentence-ending word. In embodiments, when the original language sentence 1110 is divided into two clip texts 1240, 1260 to form the original language subtitle data 1300, the translated sentence 1410 is divided into the same number (two) of clip texts 1610, 1620. To divide a sentence into "n" (natural number greater than 2) clip texts, "n-1" word(s) having greatest intra-sentence break probabilities are determined as intra-sentence clip-ending word(s). In FIG. 15A, the word 1522 having the greatest intra-sentence break probability (84%) is identified as the only clip-ending word in the translated sentence 1410. In FIG. 15B, the translated sentence 1410 is divided into two clip texts 1542, 1544 to obtain a set of translated clip texts 1530.

This selection can be done regardless the word's intra-sentence break probability (84%) is greater than a predetermined threshold (for example, 90%) for identifying a clip ending word in an original-language sentence. In embodiments, even when there are two or words having intra-sentence break probabilities greater than the predetermined threshold, only one ("n-1") word having the greatest intra-sentence can be identifies as a clip-ending word to divide the translated sentence into two ("n") clip texts.

Generating Translation Subtitle Data Having Same Time Code as Original Language Subtitle In embodiments, as shown in FIG. 16, a translation subtitle data (Korean language) 1600 can be obtained by replacing texts in the original-language subtitle 1300 clip by clip, rather than word by word. Each of the clip texts 1240, 1260, 1120 in the original-language subtitle 1300 is replaced respectively with its corresponding translation clip text 1542, 1544, 1420.

In embodiments, the sequence numbers and the time codes of the original-language subtitle 1300 can be maintained in the translation subtitle data 1600. In the translation subtitle data 1600, the first translated clip text 1542 replaces the first original-language clip text 1240 while maintaining the same sequence number 1312 and the time code 1314. As the translated clip text 1542 has not spoken in the video, timing for displaying the translated clip text 1542 is determined such that the translated clip text 1542 is in sync with sound of the corresponding clip text 1240.

Input and Output of Translation Intra-Sentence model

In embodiments, the translation intra-sentence model is very similar to the original language intra-sentence model explained above, and is trained on and specialized to a specific language, to divide sentences in that language into sentence portions or segments. Configuration, training and operations of the translation intra-sentence model can be understood with reference to those of the original language intra-sentence model.

In embodiments, the translation intra-sentence model is provided individual sentences as inputs, in embodiments, each sentence being no longer than 30 words in the translation language. The translation intra-sentence model then may identify intra-sentence breaks in the translation sentence, in embodiments, by identifying words with the highest probability to be words directly preceding a comma i.e., its comma probability, and in other embodiments, by identifying words with a punctuation probability of punctuation marks that serve as intra-sentence breaks in the translation language. Words that then meet or exceed a threshold probability may be identified as intra-sentence break words in the translation language.

Sentence Segments as Output of Translation Intra-Sentence model

In embodiments, the technologies may then try to match the defined clips in the first language with the sentences and/or sentence portions of the translation language, if the defined clip in the first language exactly matches the sentence of the second language, i.e., where a full sentence in one language is equivalent to a full sentence in the second language, then a perfectly matching clip has been produced. The clip is then provided the text from the text file of the translation language, and the subtitle of the full sentence may become the translation clip caption associated with the video and audio.

However, in embodiments, where there are several sentence portions each corresponding to a clip, then the matching translation portions as output by the translation intra-sentence model may be matched with the clips defined by the original language AI models. The translated portions are displayed as translation clip captions that may be displayed alongside the clip captions of the original language.

No Determination of Sentence Ending in Translation Language

In embodiments, when the technologies perform a sentence-by-sentence translation, there may be no determination of sentence endings, or defining sentences using a translation language sentence model because individual sentences in the original language are translated into individual sentences in the translation language. While a software or platform to generate subtitles may have a sentence model in the translation language for generating subtitles for videos recorded in the translation language, the translation language sentence model may not be used in a process to generating subtitles by translating the original language subtitles.

Live or Recorded Video

The technologies can be implemented, executed, or run on a video that have been stored or pre-saved. In embodiments, the technologies can be applied to provide subtitle for a live video stream, and to generate subtitle in real time while a video is being recorded live.

Timing of Processing

In embodiments, a processing or action for providing subtitles of a video can be performed when the video is being recorded, when recording of the video is paused, stopped, terminated, or when the video is being saved or loaded onto a specific application, computing, storage device, or a cloud network.

FIG. 1

FIG. 1 is a flow chart showing an example method 100 for providing subtitle for a video. A video is received or loaded for further processing from a local data store or a remote data store 105. At least one or more text files associated with the video or the video's relevant audio (for example, a dubbed audio) is received or obtained 110. The text file is input 115 into a sentence model, which identifies one or more sentence ending words based on their sentence-ending probability values. A word that meets or exceeds a predetermined threshold probability value may be identified as a sentence-ending word. Location of sentence ending words may be marked and/or timestamped in the text file and/or the video file. Identified sentences are defined and output 120. The sentences are then input 125 to an intra-sentence model, which is run on each sentence individually to attempt to define one or more sentence segments or portions by identifying intra-sentence breaks. The intra-sentence break may be found when a word has an intra-sentence break probability that meets or exceeds a certain probability threshold, and which may be considered by the intra-sentence model to be one that immediately precedes a comma or another intra-sentence break punctuation mark which serves as an intra-sentence break. Sentence portions separated by identified intra-sentence breaks are obtained 130. Clips (clip texts and corresponding clip time periods) are defined 135 based on identified sentence endings and identified intra-sentence breaks, and a subtitle file is generated according to the defined clips. When playing the video, clip texts are displayed in sequence during their corresponding clip time periods as subtitle 140.

FIG. 2

Figure 2:
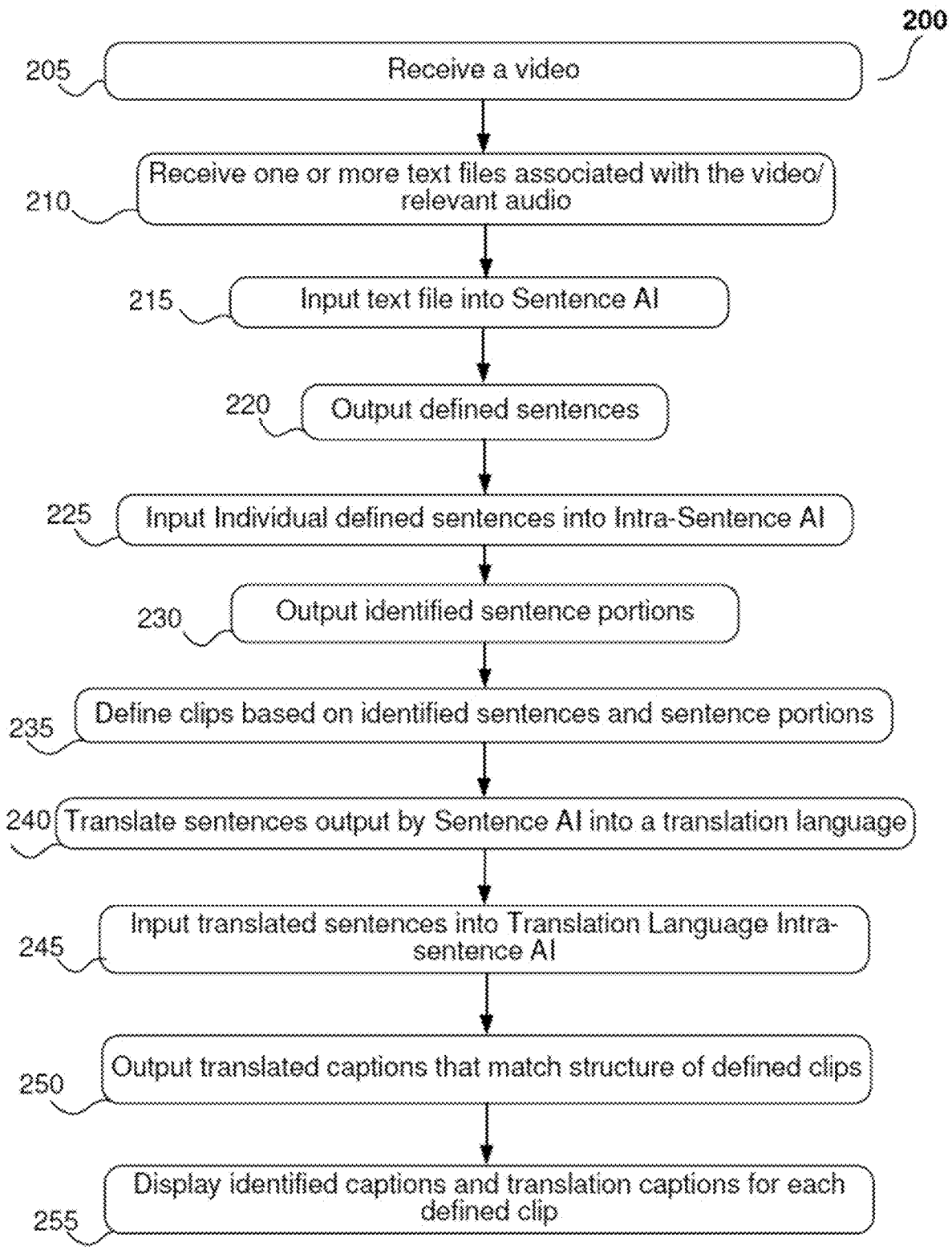
FIG. 2 is a flow chart representation of one embodiment of providing translated subtitle for a video.

FIG. 2 is a flow chart showing an example method 200 of generating and displaying translation subtitles for a video. A video is received or loaded for further processing 205. A text file (in original spoken language) associated with the video or its relevant audio is received 210. Steps 215, 220, 225, 230, 235 to define clips are the same as the steps 115 to 135 in FIG. 1. Sentences identified from the text file are then translated 240 individually to obtain translated sentences. A translation intra-sentence model is then run 245 on the translated sentences to determine intra-sentence breaks in the translated sentences. Clips in the translated sentences are defined to match clips already defined in the step 235 for the text file in the original spoken language. For example, if a sentence in the original language was split into two clips, then the translation intra-sentence model aims to produce two sentence portions from the translated sentence to define the same number of clips as the original language sentence. A translation subtitle can be generated 250 based on the clips defined for the translated sentences such that each of clip texts in the translation subtitle and its corresponding clip text in the original language subtitle share the same (or substantially same) clip time period. When playing the video, clip texts in the translation subtitle are displayed in sequence during their respective clip time periods as subtitle 255.

FIG. 3

Figure 3:
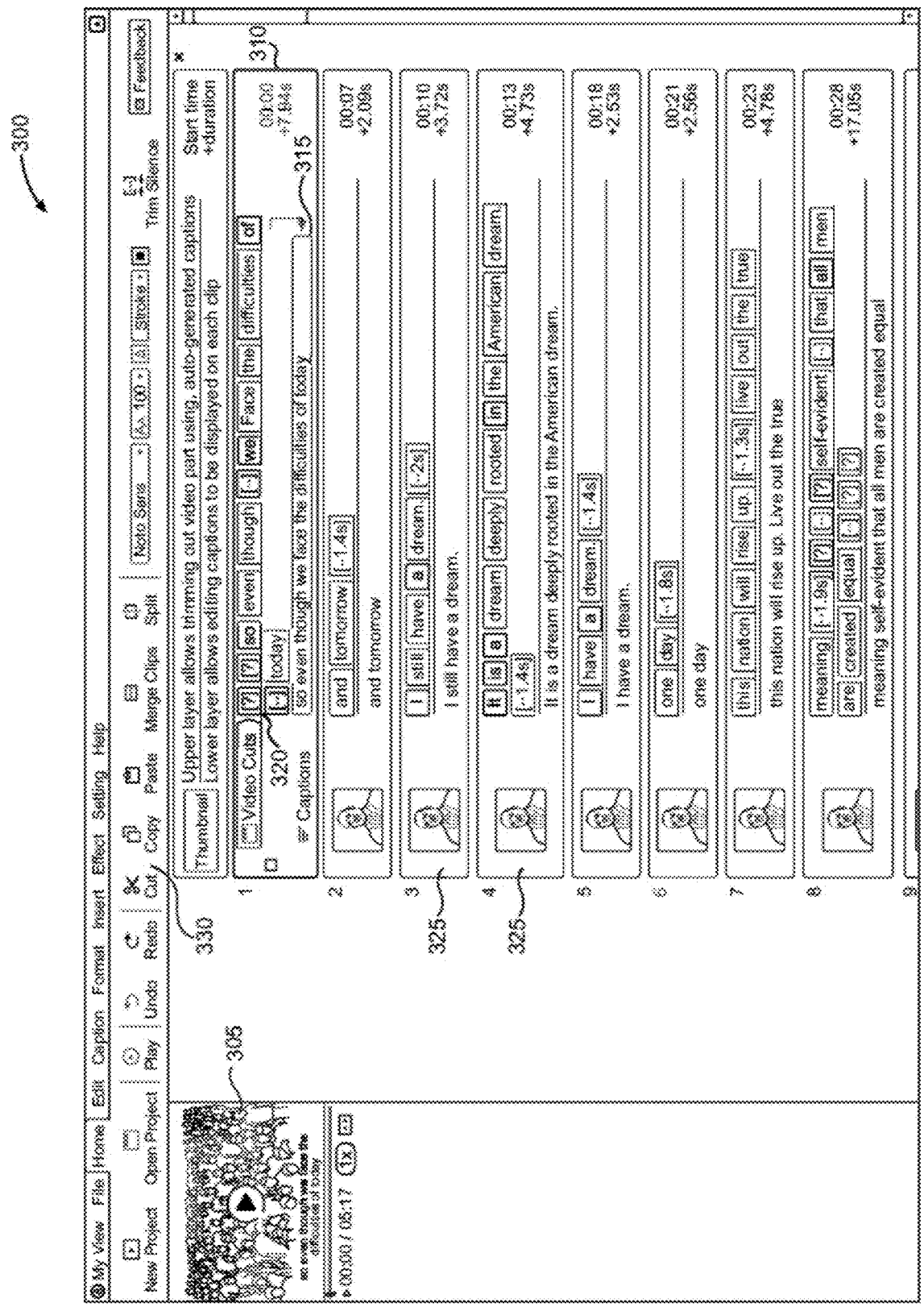
FIG. 3 presents a platform user interface where subtitles are combined with video clips and may be edited together.

FIG. 3 presents a platform user interface where subtitles are combined with video clips and where functionality is provided for video clips and clip captions to be edited simultaneously. User interface ("UI") 300 may be deployed as part of a video editing software or application and may include a video playback screen 305 where a selected video clip or a complete video may be played along with subtitles linked to the video. UI 300 may also include a clip editor panel 310 for one or more selected clips, which presents editable and manually input captions in a field 315. The clip editor panel 310 may also include video cuts 320, 325 of each selected clip. Each video cut is a segment of the video clip identified by the connected subtitle/caption words, punctuation marks, sounds, or pauses, to that portion of the clip. This enables edits of each position or segment of a clip by applying edits to the displayed word, punctuation mark, sound, or pause, which immediately applies the same edits to the corresponding segment in the clip. This makes video editing and removing pauses, silences or specific undesirable portions much more streamlined.

Thus, each identified word, punctuation mark, or pause that represents a video cut may be individually selected, edited, deleted and manipulated, this directly affects the portion of the clip that corresponds to the word representing the video cut in the same manner. For example, if a clip is made up of a speaker saying the phrase "I have a dream", if the video cut identified by the word "I" is deleted, its accompanying and linked video and audio is also automatically deleted leaving the clip with the subtitle/caption text, video, and audio of "have a dream". After the deletion occurs, playing the video would only play the "have a dream" portion.

Where there are silences or pauses that have been identified and/or marked by punctuation marks or pauses in the linked text files, these may also be displayed as individual video cuts 320, and their removal and deletion allow for easy and automatic removal of their corresponding video and audio (i.e., a pause or silence) portions in the clip. The UI 300 may also include buttons that immediately remove all identified pauses, stops, silences, select words or punctuation marks, and/or other undesirable sounds from one or more clips, or from the whole video with one click. The UI 300 thus allows much easier editing and removal of undesirable parts or video cuts 320 from video clips because of links between the subtitle text and the corresponding video/audio portions.

FIG. 4

Figure 4:
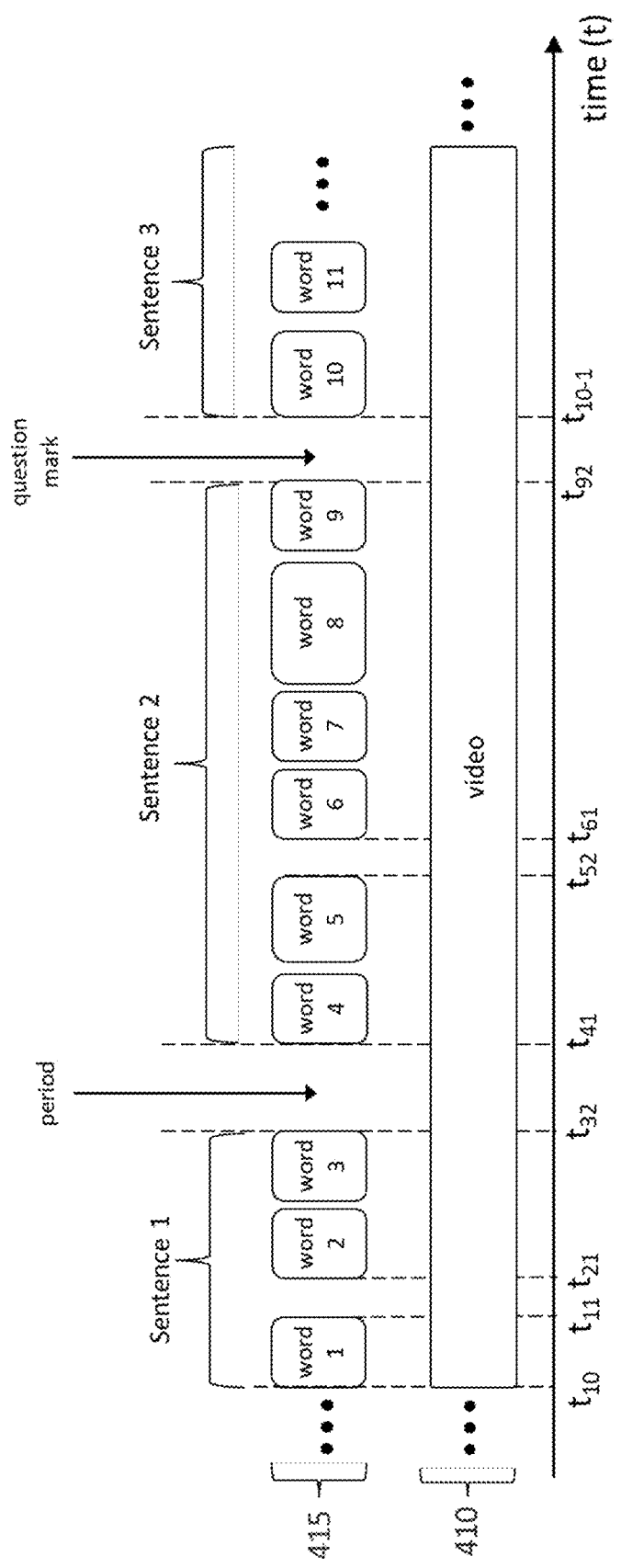
FIG. 4 is a diagrammatical representation of an association between a text file and a video when a sentence model is executed on a video and its text file(s).

FIG. 4 depicts a diagrammatical representation of a video 410 and its corresponding script text 415 (STT text) displayed along a timeline. The script text 415 is presented as blocks of words, where each word block represents a time period of the corresponding word in the video. The word 1's sound starts at $t_{10}$ and ends at $t_{11}$ in the video. In embodiments, the script text 415 is obtained from a STT processing of the video's audio, the word 1 is obtained by transcribing the video's audio from $t_{10}$ to $t_{11}$. In embodiments, time stamp (time code) of the word 1, which can be one or both of $t_{10}$ and $t_{11}$, can be included in the video's subtitle data. The word 1 and the word 2 are separated by silence from $t_{11}$ to $t_{21}$. In embodiments, a sentence model processes the script text 415 to compute a sentence-ending probability (or a sentence-starting probability) for one or more words in the text. The word 3 is determined to be the ending word of the sentence 1 based on its sentence-ending probability. In embodiments, a sentence model identifies or determines punctuation marks that end sentences in the text 415. For instance, in FIG. 4, the sentence model determines a period as the sentence-ending punctuation for the sentence 1 and a question mark for the sentence 3.

FIG. 5

Figure 5:
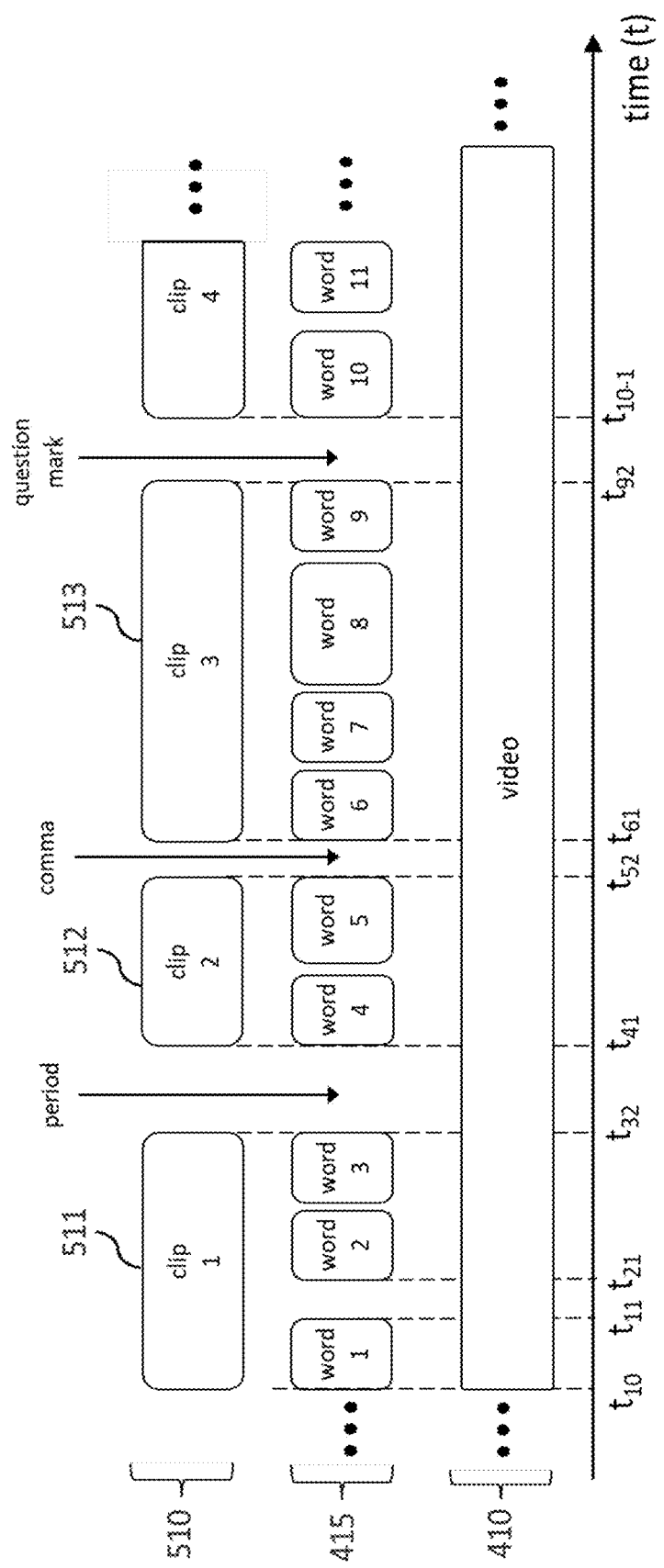
FIG. 5 is a diagrammatical representation of an embodiment showing the associations between a text file and a video when AI models are executed on a video and its text file(s) to produce clips.

FIG. 5 depicts a diagrammatical representation of clips 510 defined for the video 410 and the script text 415. In embodiments, an intra-sentence model processes sentence in the text 415 to find one or more intra-sentence breaks. For instance, in FIG. 4, the intra-sentence model determines that a comma as the intra-sentence break in sentence 2. Based on sentence-ending punctuation and intra-sentence break, sentence 1 forms clip text of a sling clip 511. The sling clip 511 is defined by its start time $t_{10}$ (starting time code of the first word 1) and its end time $t_{32}$ (ending time code of the last word 3). The time codes $t_{10}$ and $t_{32}$ are included in the video's subtitle data to indicate timing of presenting the words 1-3. In embodiments, time code $t_{21}$ of words are not excluded from the subtitle data when it does not make any difference to presenting the words 1-3 as subtitle. Sentence 2 are divided into two clips 512, 513 using time code $t_{52}$ (ending of word 5 immediately preceding the identified comma) and time code $t_{61}$ (start of word 6 immediately following identified comma), words 4-5 forms clip text of clip 512, and words 6-9 forms clip text of clip 513.

FIG. 6

Figure 6:
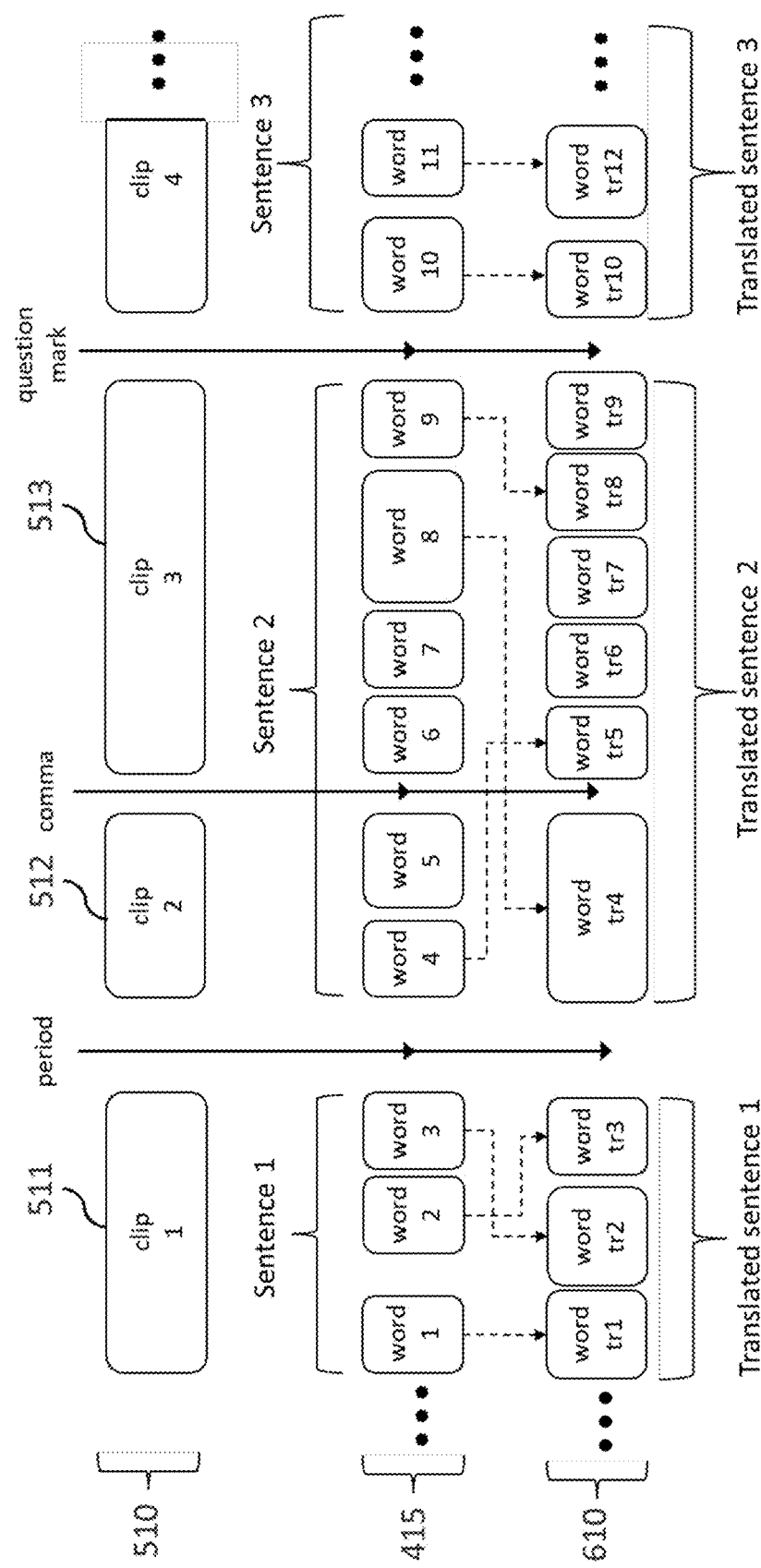
FIG. 6 is a diagrammatical representation of an embodiment showing the associations between text files of different languages and a video when AI models are run on the video and its text files for translation into another language.

FIG. 6 depicts a diagrammatical representation of associations between the script text 415 in the original spoken language and a translated script text 610 to provide subtitle data in a translated language. In embodiments, the translated script text 610 is obtained by a sentence-by-sentence translation of the original-language text 415. Translation of sentence 1 itself forms translated clip text of clip 512. Translation of sentence 2 is divided into the same number of clip texts (two) as the original-language sentence 2 regardless the number of intra-sentence breaks that would be identified by running an intra-sentence model (in the translated language) on the translated sentence 2 (for example, even when it is more natural not to have of intra-sentence break, the translated sentence 2 is divided into two to match the number of clip texts identified in the original-language sentence 2). Clips 511-513 defined based on the original-language text 415 are maintained in preparing translation subtitle data as the translated text 610 does not have time code of its own. In embodiment, words may be exchanged or placed in different clips even if they directly match in the text for the translation to make sense. For example, word 4 translates into word tr5 in the translation language, but word tr5 appears as subtitle in clip 513 while word 4 appears as subtitle in clip 512. In embodiments, clip ending words in the original language and the translated language do not match in their meaning. For example, word 3 and word tr3 ending the same clip 511 do not match in their meaning as translation of word 3 is word tr2 rather than word tr3.

Figure 7A:
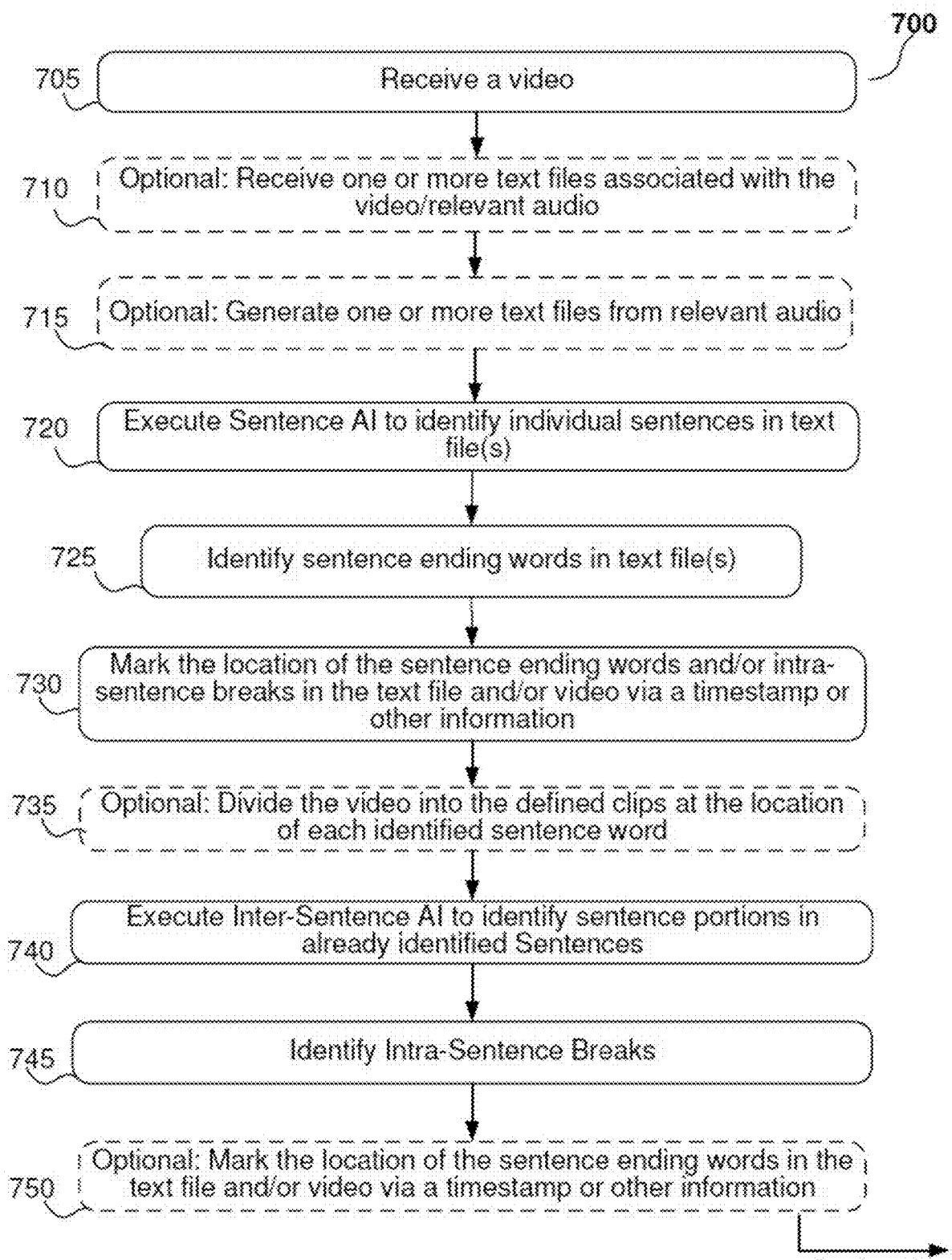
FIG. 7A and FIG. 7B present an embodiment of a method to detect sentence endings, intra-sentence breaks, and optional translation into another language to create subtitles in one or more languages for video clips.
Figure 7B:
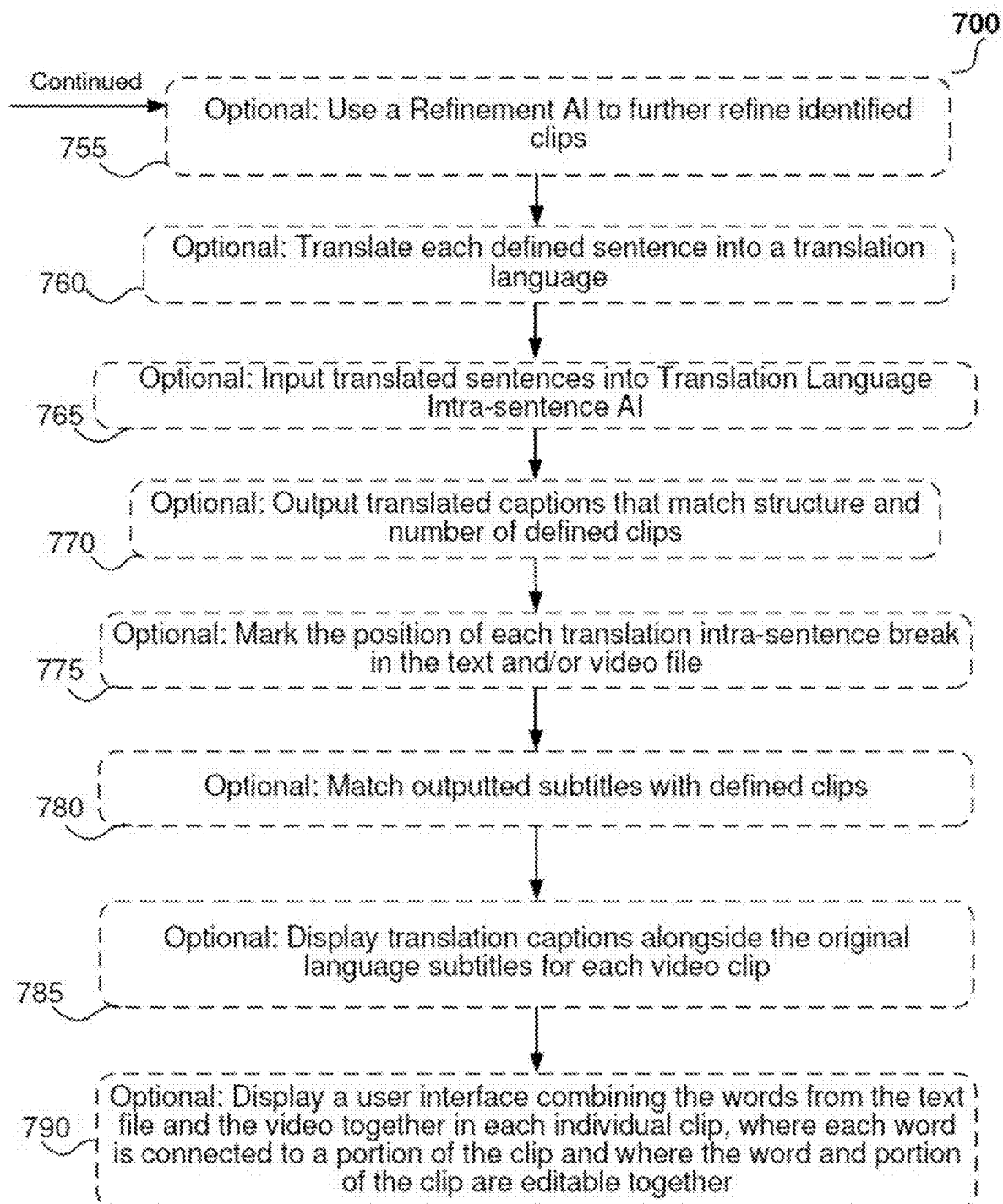

FIG. 7A and FIG. 7B

FIG. 7A and FIG. 7B present an embodiment of a method to detect sentence endings, intra-sentence breaks, and optional translation into another language to create subtitles in one or more languages for video clips. In this embodiment of a method 700 to create subtitles from a video, a video is received 705 by the system or platform, along with one or more associated text files that may optionally be received 710. These text files may contain a transcription or pre-made subtitles related to the video. One or more text files may be additionally or alternatively generated 715 by the technologies via AI models or audio extraction or transcription methods described herein. The sentence model may be run on the text file, taking in text of specific maximum input size to run efficiently. If the probability value of a word meets or exceeds a threshold, where the threshold may be pre-defined or determined by a sentence model or otherwise, then the word is marked or identified 725 as a sentence ending word, the position of the identified sentence ending word is marked 730 in the text file and/or in the corresponding video and relevant audio files. Marking could occur by any suitable method including by adding timestamps, manipulating or altering metadata or any relevant text, audio, or video files, or any relevant video editing files. After, the position of sentence ending words are established, the video is divided 735 into several clips, with each clip encompassing one and only one complete sentence. Each clip ending at a sentence ending word. A second AI model, the intra-sentence model may then also be executed 740 in a similar manner on the sentences/clips produced by the sentence model to further refine the clips produced by identifying intra-sentence breaks.

Intra-sentence breaks are identified by comma or punctuation probabilities of the words in the text file, i.e., the probability that a word immediately precedes a punctuation mark that may divide a sentence. In embodiments, a word may have different punctuation probabilities for each space adjacent to it, i.e., a different punctuation probability for each side of a word, for example a punctuation probability of 50% that a specific punctuation mark is directly to its left, and an 85% punctuation probability that it is on its right. One side of a word may also include a space between it and the punctuation mark that may precede the space or follow it. In embodiments, punctuation probability for only one side of the word is considered, and this may depend on the language of the text, e.g., the space directly to the right of a word in English, following the word, is the one that is generally considered. If the punctuation probability of a word meets or exceeds a threshold, where the threshold may be pre-defined or determined by an AI model or any other method, then either the word is identified 745 as being adjacent to a punctuation mark or the specific space is identified 745 as an intra-sentence punctuation mark or comma.

Once the intra sentence break location has been identified 745, then the location may be marked 750 in the text file and/or corresponding video location. Marking could occur by any suitable method including by adding timestamps, manipulating or altering metadata or any relevant data in the text, audio, or video files, or any relevant video editing files. An alternative or additional optional AI refinement model may be deployed 755 on identified sentences and/or sentence portions in the text file to use other factors to identify sentence endings and intra-sentence breaks, these factors may include and are not limited to one or more of the following: pauses or silences in clips or the audio, specific phrases, specific words, or the length of a clip, length of a sentence, or other user configurations and settings. Optionally, the original text file may be translated 760 into another language. The translation 760 into the translation language is carried out sentence by sentence, with the sentences identified by sentence model. Then translated sentences may be input 765 into an intra-sentence translation AI to identify intra-sentence breaks to match with defined clips. The translation intra-sentence model then outputs 770 translated captions that match the structure of the defined clips, the position of these sentences/sentence portions may then be marked 775 in the translation text file and/or video file, and then they are matched 780 with the corresponding video clip. The translated captions are displayed 785 alongside the original language subtitles for each video clip. Any or all of the generated captions in any or all of the languages may then be displayed 790 on a user interface where the clip captions are combined with their corresponding video clips and may be edited together on the user interface. For one example of the user interface, see FIG. 3 in the Subject Application.

Figure 8:
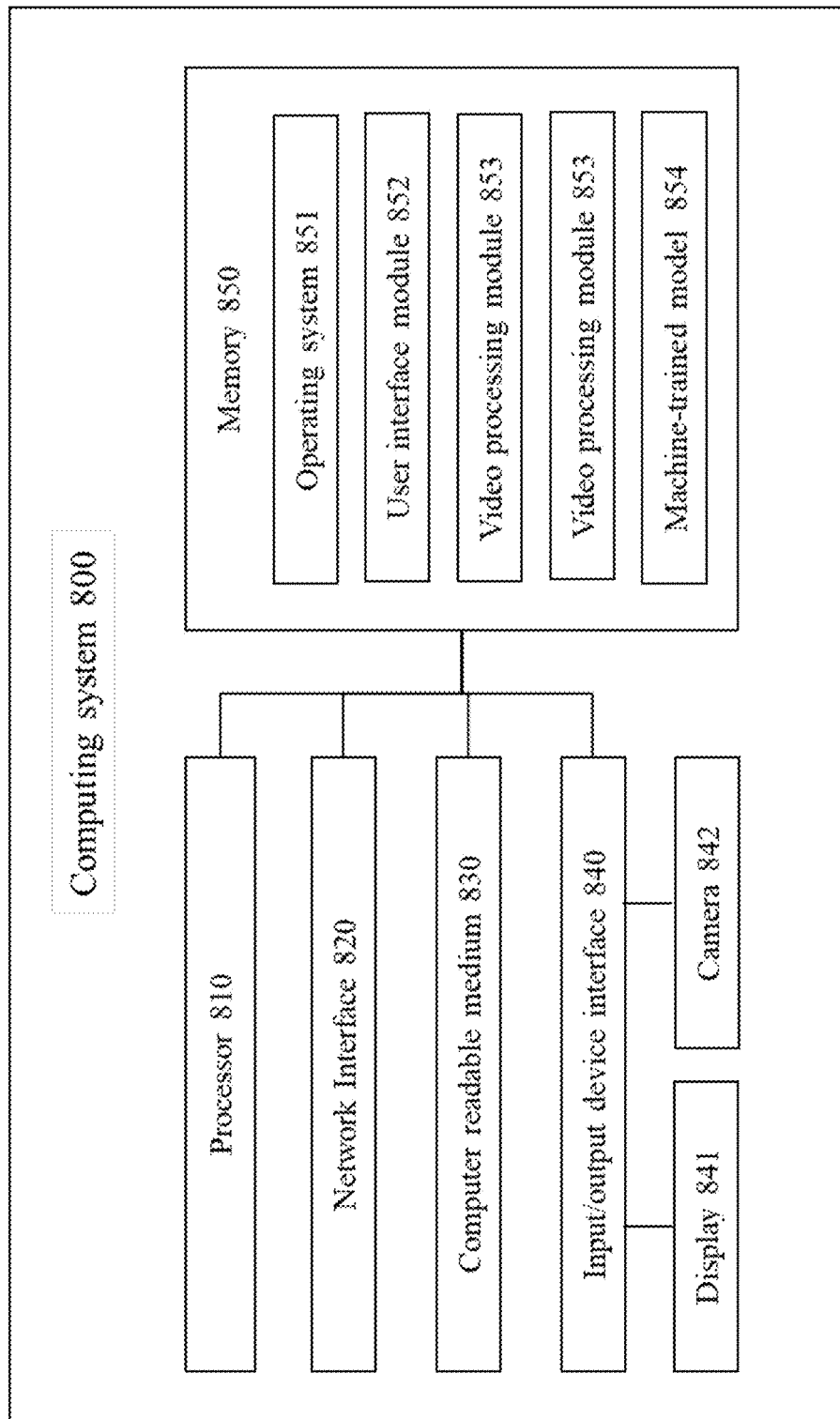
FIG. 8 is a diagrammatic representation of an example machine in the form of a computer system that may be used to run any of the methods disclosed herein.

FIG. 8—Example Architecture of User Computing System

FIG. 8 depicts an architecture of an example computing device 800 that can be used to perform one or more feature of the technologies. The general architecture of the computing device 800 includes an arrangement of computer hardware and software modules that may be used to implement one or more aspects of the present disclosure. The computing device 800 may include many more (or fewer) elements than those shown in FIG. 8. It is not necessary, however, that all of these elements be shown in order to provide an enabling disclosure.

The example computing device 800 includes a processor 810, a network interface 820, a computer readable medium 830, and an input/output device interface 840, all of which may communicate with one another by way of a communication bus. The network interface 820 may provide connectivity to one or more networks or computing systems. The processor 810 may also communicate with memory 850 and further provide output information for one or more output devices, such as a display (e.g., display 841), speaker, etc., via the input/output device interface 840. The input/output device interface 840 may also accept input from one or more input devices, such as a camera 842 (e.g., 3D depth camera), keyboard, mouse, digital pen, microphone, touch screen, gesture recognition system, voice recognition system, accelerometer, gyroscope, etc.

The memory 850 may contain computer program instructions (grouped as modules in some implementations) that the processor 810 executes in order to implement one or more aspects of the present disclosure. The memory 850 may include RAM, ROM, and/or other persistent, auxiliary, or non-transitory computer readable medium.

The memory 850 may store an operating system 851 that provides computer program instructions for use by the processor 810 in the general administration and operation of the computing device 800. The memory 850 may further include computer program instructions and other information for implementing one or more aspects of the present disclosure.

In one implementation, for example, the memory 850 includes a user interface module 852 that generates user interfaces (and/or instructions therefor) for display, for example, via a browser or application installed on the computing device 800. In addition to and/or in combination with the user interface module 852, the memory 850 may include a video processing module 853, a text processing module 854, and a machine-training model 854 that may be executed by the processor 810.

Although a single processor, a single network interface, a single computer readable medium, a singer input/output device interface, a single memory, a single camera, and a single display are illustrated in the example of FIG. 8, in other implementations, the computing device 1500 can have a multiple of one or more of these components (e.g., two or more processors and/or two or more memories).

Processing Using and Remote Computing Device

In embodiments, one or more processes of the technologies can be performed by the example computing device 800, by a remote server, or by the example computing device 800 and the remote server in combination. For example, when a smartphone that does not have a machine-trained model on its local data store, the smartphone may communicate with a remote computing server or a cloud-computing system to perform one or more processes of the technologies.

Computer-executable Instructions

Logical blocks, modules or units described in connection with implementations disclosed herein can be implemented or performed by a computing device having at least one processor, at least one memory and at least one communication interface. The elements of a method, process, or algorithm described in connection with implementations disclosed herein can be embodied directly in hardware, in a software module executed by at least one processor, or in a combination of the two. Computer-executable instructions for implementing a method, process, or algorithm described in connection with implementations disclosed herein can be stored in a non-transitory computer readable storage medium.

Alternative Implementations and Obvious Modifications

Although the implementations of the inventions have been disclosed in the context of certain implementations and examples, it will be understood by those skilled in the art that the present inventions extend beyond the specifically disclosed implementations to other alternative implementations and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or sub-combinations of the specific features and aspects of the implementations may be made and still fall within one or more of the inventions. Accordingly, it should be understood that various features and aspects of the disclosed implementations can be combined with or substituted for one another in order to form varying modes of the disclosed inventions. Thus, it is intended that the scope of the present inventions herein disclosed should not be limited by the particular disclosed implementations described above, and that various changes in form and details may be made without departing from the spirit and scope of the present disclosure as set forth in the claims.

What is claimed is:

1. A method of providing subtitle for a video, the method comprising:
processing audio data of a video to generate a timed script in a first language which comprises a first sequence of words and a time stamp for each word of the first sequence of words;
processing the first sequence of words to compute, using a first machine-trained model, a sentence-ending probability for at least on word of the first sequence of words;
determining a first word of the first sequence as a first sentence-ending word based on the sentence-ending probability of the first word, which defines a first sentence that ends with the first word;
processing the first sentence to compute, using a second machine-trained model, an intra-sentence break probability for at least one word of the first sentence;
determining a second word of the first sentence as a clip-ending word based on the intra-sentence break probability of the second word, which defines a first clip text that ends with the second word, wherein defining of the first clip text further defines a first clip period that corresponds to the first clip text and ends at a time when the second word has been spoken in the video; and
generating first language subtitle data comprising the first clip text and information indicative of the first clip period during which the first clip text is to be displayed as subtitle in the first language,
wherein the method further comprises:
translating the first sentence into a first translated sentence in a second language, the first translated sentence ending with a first translated word;
processing the first translated sentence to compute, using a third machine-trained model, an intra-sentence break probability for at least one word of the first translated sentence;
determining a second translated word of the first translated sentence as a clip-ending word based on the intra-sentence break probability of the second translated word, which defines a first translated clip text that ends with the second translated word;
generating second language subtitle data comprising the first translated clip text and information indicative of a second language period during which the first translated clip text is to be displayed as subtitle in the second language,
wherein the first clip period for displaying the first clip text is identical or substantially identical to the second language period for displaying the first translated clip text regardless of whether the second word ending the first clip text corresponds to the second translated word ending the first translated clip text in meaning.

2. The method of claim 1, wherein the first translated clip text in the second language does not correspond to the first clip text in the first language in meaning.

3. The method of claim 1, wherein the first translated clip text is a translation of the first clip text.

4. The method of claim 1, wherein generating the second language subtitle data comprises specifying the time when the second word has been spoken in the first language as the second language period's end such that the first clip period and the second language period end at the same time.

5. The method of claim 1,
wherein the timed script comprises the second word's time stamp indicative of the time when the second word has been spoken in the video,
wherein generating the second language subtitle data comprises specifying, in the second language subtitle data, the second word's time stamp as end of the first clip period and the second language period according to a predetermined subtitle format.

6. The method of claim 5,
wherein the first clip text starts with a third word of the first sentence, and the first translated clip text starts with a third translated word of the first translated sentence,
wherein the timed script comprises the third word's time stamp indicative of the time when sound of the third word starts in the video,
wherein generating the second language subtitle data further comprises specifying, in the second language subtitle data, the third word's time stamp as start of the first clip period and the second language period such that the first clip period and identical to the second language period regardless of whether the third word corresponds to the third translated word in meaning.

7. The method of claim 1,
wherein processing audio data of the video to generate the timed script comprises performing a speech-to-text (STT) processing of the audio data in which audio corresponding to the second word is transcribed to the second word, the time when the second word has been spoken in the video is determined, and the time when the second word has been spoken is specified in the timed script for the second word,
wherein the information indicative of the first clip period comprises the time when the second word has been spoken determined by the STT processing, and
wherein generating the first language subtitle data comprises associating the time when the second word has been spoken, determined by the STT processing, with the first clip text as the first clip period's end according to a predetermined subtitle file format.

8. The method of claim 1, wherein processing audio data of the video to generate the timed script comprises:
identifying silence and non-silence sound in the audio data, wherein the non-silence sound comprises the second word's corresponding sound;
transcribing the second word's corresponding sound to the second word to obtain the first sequence of words;
determining, for the second word, an end time when second word's corresponding sound ends in the video;
including the determined end time as the second word's time stamp in the timed script.

9. The method of claim 1, wherein processing audio data of the video to generate the timed script comprises:
obtaining a pre-written script of the video, wherein the pre-written script comprises the first sequence of words but does not comprise a time stamp for the first sequence of words;
locating, for each word in the first sequence of words, a corresponding sound in the audio data which identifies a first sound corresponding to the second word;
determining an end time of the first sound when the first sound ends in the video; and
combining the determined end time and the first sequence of words to generate the timed script such that the determined end time is specified as the second word's time stamp in the timed script.

10. The method of claim 1,
wherein the first translated sentence does not include a punctuation mark that indicates an intra-sentence break in the first translated sentence,
wherein the third machine-trained model is trained using a plurality of punctuated sentences in the second language such that the third machine-trained model is configured to compute, for at least one word in an input sentence, a probability that at least one intra-sentence break punctuation mark would immediately follow.

11. The method of claim 1,
wherein the first sentence is divided into an "n" number of clip texts at least based on the first word and the second word, wherein "n" is a natural number greater than "2",
wherein the first translated sentence is divided into the same "n" number of translated clip texts.

12. The method of claim 11, further comprising determining a third word of the first sentence as a clip-ending word, which defines a second clip text that begins with a word immediately following the second word and ends with the third word,
wherein defining of the second clip text further defines a second clip that corresponds to the second clip text and ends at a time when the third word has been spoken in the vide,
wherein the third word in the first sentence is identified as a clip-ending word based on at least one of the intra-sentence break probability of the third word and a length of silence that follows the third word's sound in the video.

13. The method of claim 1,
wherein the first language subtitle data is configured to such that the first clip text, in its entirety, appears as subtitle of the video at the first clip period's start and is maintained without an interruption until the first clip period's end,
wherein the second language subtitle data is configured to such that the first translated clip text, in its entirety, appears as subtitle of the video at the second language period's start and is maintained without an interruption until the second language period's end.

14. A non-transitory computer readable medium storing instructions that, when executed by at least one processor, cause the at least one processor to perform the method of claim 1.

15. A system for providing subtitle for a video, the system comprising:
at least one processor; and
at least one memory storing instructions that, when executed by the at least one processor, cause the at least one processor to perform the method of claim 1.

* * * * *